US011585669B2

(12) United States Patent
Kundu et al.

(10) Patent No.: US 11,585,669 B2
(45) Date of Patent: Feb. 21, 2023

(54) VEHICLE ROUTING USING CONNECTED DATA ANALYTICS PLATFORM

(71) Applicant: Hitachi, Ltd., Tokyo (JP)

(72) Inventors: Subrata Kumar Kundu, Canton, MI (US); Yashodeep Dilip Lonari, Novi, MI (US)

(73) Assignee: HITACHI, LTD., Tokyo (JP)

( * ) Notice: Subject to any disclaimer, the term of this patent is extended or adjusted under 35 U.S.C. 154(b) by 18 days.

(21) Appl. No.: 17/007,565

(22) Filed: Aug. 31, 2020

(65) Prior Publication Data

US 2022/0065644 A1    Mar. 3, 2022

(51) Int. Cl.
    *G01C 21/34*    (2006.01)
(52) U.S. Cl.
    CPC ..... *G01C 21/3469* (2013.01); *G01C 21/3446* (2013.01); *G01C 21/3461* (2013.01)
(58) Field of Classification Search
    CPC ................ G01C 21/34; G01C 21/3469; G01C 21/3446; G01C 21/3461
    See application file for complete search history.

(56) References Cited

U.S. PATENT DOCUMENTS

| | | | | |
|---|---|---|---|---|
| 10,107,635 | B2 * | 10/2018 | Larner | G05D 1/0212 |
| 10,259,451 | B2 * | 4/2019 | Wan | A61B 5/18 |
| 10,710,607 | B2 | 7/2020 | Peterson et al. | |
| 10,976,745 | B2 * | 4/2021 | Chu | G05D 1/0088 |
| 2015/0266488 | A1 * | 9/2015 | Solyom | B60W 50/0205 701/28 |
| 2016/0025505 | A1 * | 1/2016 | Oh | G01C 21/3461 701/23 |
| 2018/0051995 | A1 * | 2/2018 | Delling | G01C 21/3415 |
| 2018/0107216 | A1 | 4/2018 | Beaurepaire et al. | |
| 2019/0049259 | A1 * | 2/2019 | Galan-Oliveras | G01C 21/3461 |
| 2019/0064840 | A1 * | 2/2019 | Becker | G01S 13/931 |
| 2019/0235497 | A1 * | 8/2019 | Glebov | B60W 50/00 |
| 2019/0294167 | A1 * | 9/2019 | Kutila | G06Q 10/04 |
| 2019/0324124 | A1 * | 10/2019 | O'Keeffe | G01S 7/4817 |
| 2019/0324451 | A1 * | 10/2019 | Obata | B60W 50/14 |
| 2019/0384302 | A1 * | 12/2019 | Silva | G05D 1/0088 |
| 2020/0089241 | A1 * | 3/2020 | Kao | G01C 21/3492 |
| 2020/0124432 | A1 * | 4/2020 | Heap | G05D 1/0217 |
| 2021/0048825 | A1 * | 2/2021 | Elvitigala | B60W 60/0023 |
| 2021/0063181 | A1 * | 3/2021 | Saleh | G01C 21/3492 |

(Continued)

FOREIGN PATENT DOCUMENTS

| | | | |
|---|---|---|---|
| JP | 2018200202 A | 12/2018 | |
| JP | 2019020127 A | 2/2019 | |

(Continued)

*Primary Examiner* — Ryan Rink
(74) *Attorney, Agent, or Firm* — Mattingly & Malur, PC

(57) ABSTRACT

In some examples, a system may determine a plurality of routes between a source location and a destination location. Further, the system may segment each route of the plurality of routes into multiple road segments. The system may determine a first field of view (FOV) for each road segment. In addition, the system may receive vehicle sensor configuration information for vehicle sensors on board a vehicle. The system may determine a second FOV for the vehicle sensors. Additionally, the system may select a route for the vehicle based at least on comparing the second FOV with the first FOV for a plurality of the road segments.

20 Claims, 19 Drawing Sheets

(56) References Cited

U.S. PATENT DOCUMENTS

2021/0097147 A1* 4/2021 DeVore ................... G06T 17/05
2021/0114553 A1* 4/2021 Awtar ...................... B60N 2/39
2021/0142526 A1* 5/2021 Mantyjarvi ........... G06T 19/006

FOREIGN PATENT DOCUMENTS

WO     2016/109637 A     7/2016
WO     2018/230640 A1    12/2018
WO     2019/089444 A1    5/2019

* cited by examiner

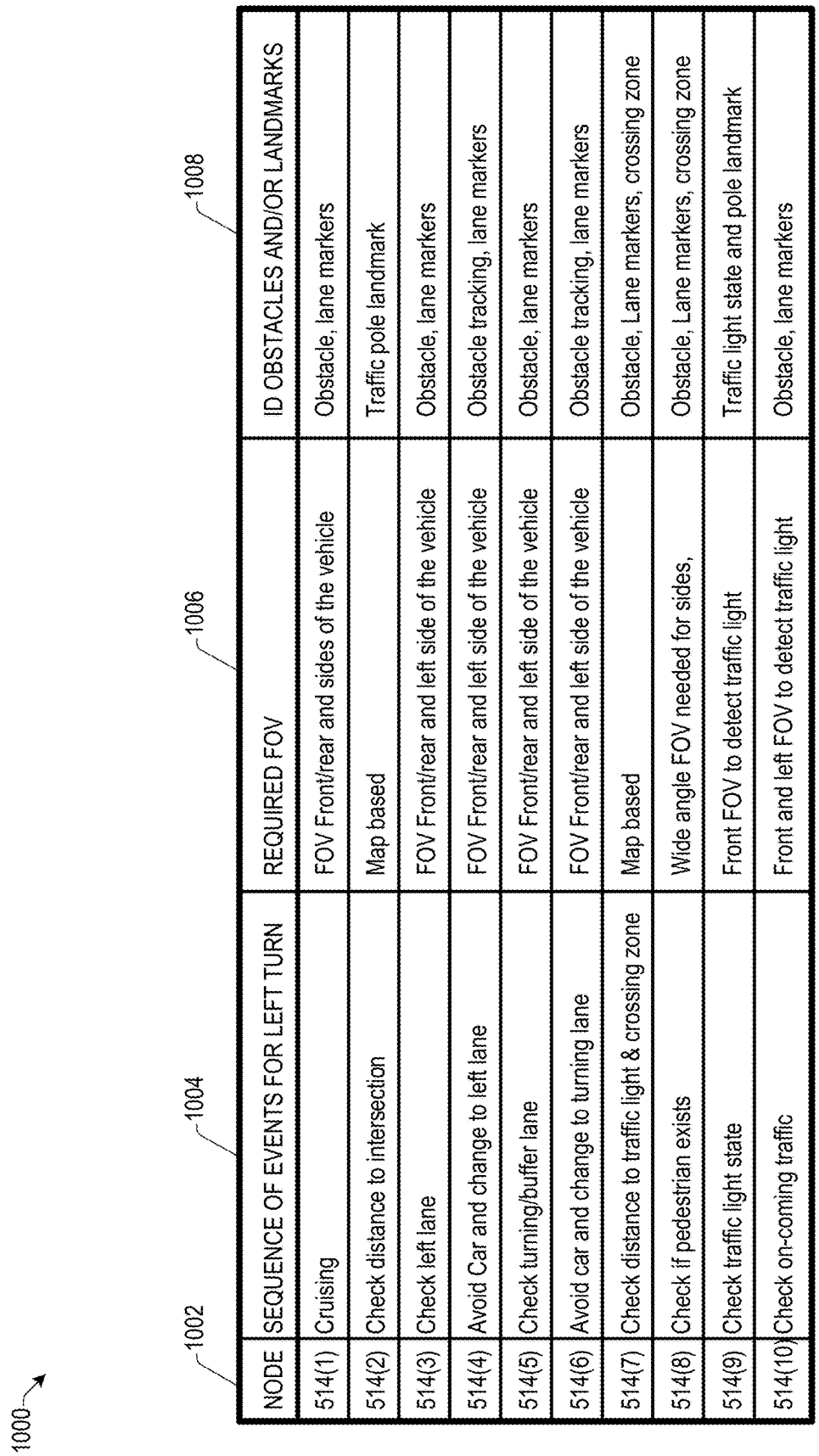

FIG. 10

| NODE | SEQUENCE OF EVENTS FOR LEFT TURN | REQUIRED FOV | ID OBSTACLES AND/OR LANDMARKS |
|---|---|---|---|
| 514(1) | Cruising | FOV Front/rear and sides of the vehicle | Obstacle, lane markers |
| 514(2) | Check distance to intersection | Map based | Traffic pole landmark |
| 514(3) | Check left lane | FOV Front/rear and left side of the vehicle | Obstacle, lane markers |
| 514(4) | Avoid Car and change to left lane | FOV Front/rear and left side of the vehicle | Obstacle tracking, lane markers |
| 514(5) | Check turning/buffer lane | FOV Front/rear and left side of the vehicle | Obstacle, lane markers |
| 514(6) | Avoid car and change to turning lane | FOV Front/rear and left side of the vehicle | Obstacle tracking, lane markers |
| 514(7) | Check distance to traffic light & crossing zone | Map based | Obstacle, Lane markers, crossing zone |
| 514(8) | Check if pedestrian exists | Wide angle FOV needed for sides, | Obstacle, Lane markers, crossing zone |
| 514(9) | Check traffic light state | Front FOV to detect traffic light | Traffic light state and pole landmark |
| 514(10) | Check on-coming traffic | Front and left FOV to detect traffic light | Obstacle, lane markers |

1900

```
                    ┌──────────┐
                    │  FROM    │
                    │  BLOCKS  │
                    │ 1318-1322│
                    │  FIG. 13 │
                    └──────────┘
```

RECEIVE, AS INPUTS, CANDIDATE ROUTES FROM ROUTE FOV ALGORITHM, DRIVE HORIZON ALGORITHM, AND VEHICLE DYNAMICS ALGORITHM  1902

INITIATE ROUTE SEARCH REQUEST  1904

COLLECT ROAD SEGMENT NETWORK TOPOLOGY AND INFORMATION ABOUT EACH ROAD SEGMENT ON ALL ROUTES, I.E., PERCENT FOV COVERAGE, EFFICIENCY, COMFORT, COLLISION PROBABILITY, TRAVEL TIME, TRAFFIC, PLANNING HORIZON, AND SO FORTH  1906

CONVERGED?  1908 — YES → (loop back)

NO ↓

ALL ROUTES EVALUATED?  1912 — YES → END 1914

CUSTOMIZABLE CONVERGENCE CRITERION:
SAFETY (THRESHOLD)
EFFICIENCY (THRESHOLD)
COMFORT (THRESHOLD)
1910

OBJECTIVE FUNCTION (CUSTOMIZABLE):
$J = w1*TT + w2*\%FOV_{COV} + w3*efficiency + w4*COMF + w5*AD_{DURATION}...$
1918

DEFINED CONSTRAINTS (CUSTOMIZABLE):
TRAFFIC JAM
EXPECTED TIME OF ARRIVAL
VEHICLE SENSOR FOV
VEHICLE DYNAMICS
POWERTRAIN DYNAMICS
1920

EXECUTE AI BASED OPTIMIZATION ROUTING SIMULATOR  1916

APPLY RULE-BASED HEURISTICS  1922

SELECT BEST ROUTE  1924

UPDATE THE SELECTED ROUTE BASED ON RECEIVED UPDATED LOCAL CONDITION INFORMATION  1926

TO BLOCK 1326 FIG. 13

FIG. 19

VEHICLE ROUTING USING CONNECTED DATA ANALYTICS PLATFORM

BACKGROUND

Advanced driver assistance systems (ADAS) and semi-autonomous vehicle systems, self-driving systems, or otherwise autonomous driving (AD) systems are systems that automate or otherwise enhance vehicle control for improved safety, automated navigation, improved convenience, improved efficiency, and the like. Conventional navigation systems in traditional vehicles may typically provide one or more routing options for traveling from a source location to a destination location. Examples of factors considered by conventional navigation systems when determining routing options may include time to destination, traffic conditions, whether tolls are expected, road closures, and the like. Further, ADAS and AD system vehicles are typically equipped with multiple onboard sensors to continuously monitor 360 degrees around the vehicle, such as for recognizing obstacles and enabling navigation of the vehicle. However, when determining a route for a vehicle, current systems may not take into consideration sensor capabilities and overall vehicle safety for a route prior to selecting the route.

SUMMARY

In some implementations, a system may determine a plurality of routes between a source location and a destination location. Further, the system may segment each route of the plurality of routes into multiple road segments. The system may determine a first field of view (FOV) for each road segment. In addition, the system may receive vehicle sensor configuration information for vehicle sensors on board a vehicle. The system may determine a second FOV for the vehicle sensors. Additionally, the system may select a route for the vehicle based at least on comparing the second FOV with the first FOV for a plurality of the road segments.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 10 illustrates an example data structure of a sequence of events for performing a left turn according to some implementations.

FIG. 19 is a flow diagram illustrating an example optimization algorithm as a process for route optimization according to some implementations.

DESCRIPTION

Figure 1:
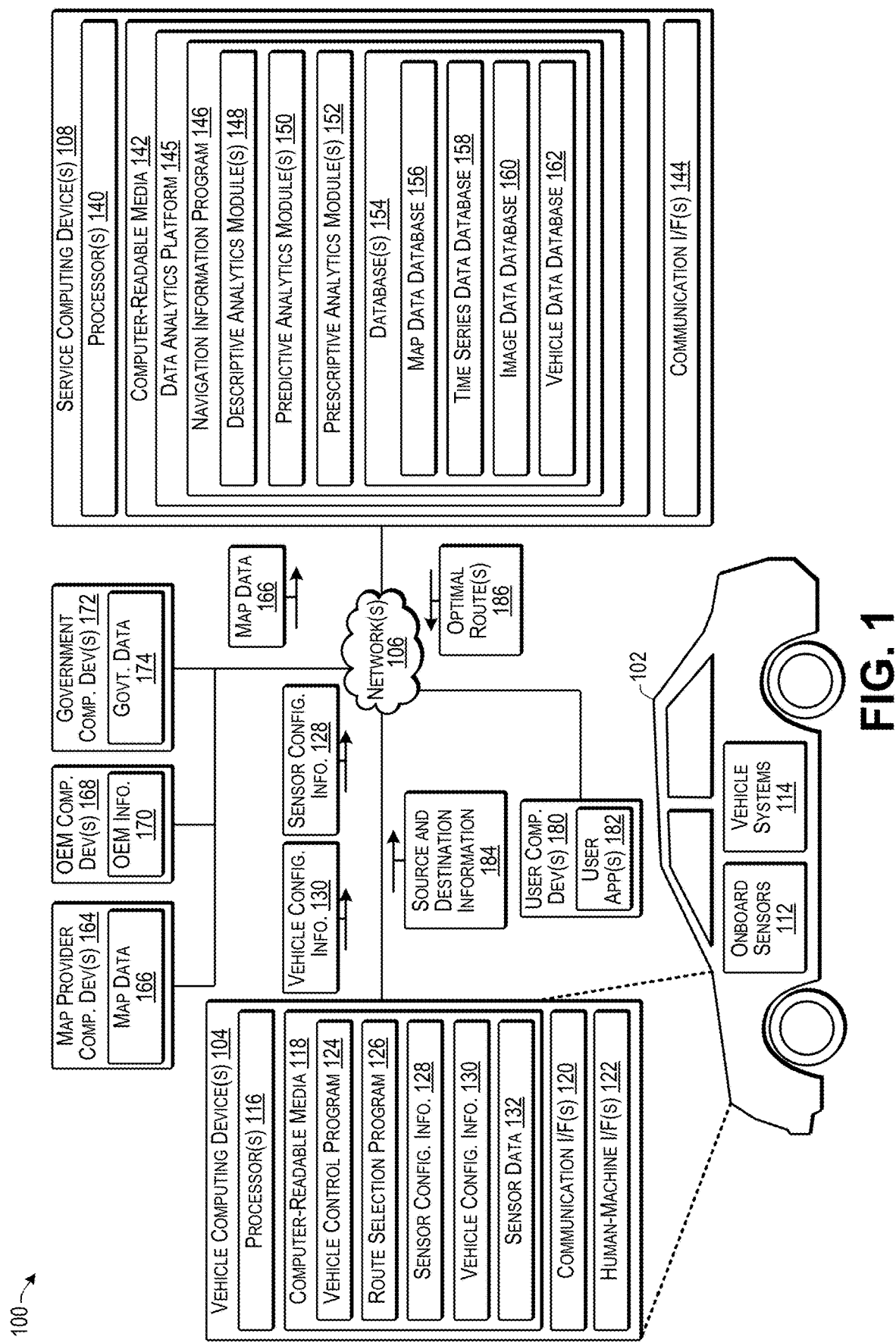
FIG. 1 illustrates an example route selection and vehicle navigation system according to some implementations.

Some implementations herein are directed to techniques and arrangements for selecting an optimally safe and fuel-efficient route for a vehicle to travel from a source location to a destination location. For instance, the types and capabilities of onboard sensors employed on the vehicle may be taken into consideration when selecting an optimal route from among candidate routes. When selecting the optimal route, the system herein may further take into consideration potential road features on each candidate route, field of view (FOV) necessary for navigating each candidate route, vehicle features and capabilities, external conditions along each candidate route, and predicted fuel expenditure for each candidate route. In some examples, the vehicle may access a connected data analytics platform to provide information to the data analytics platform regarding the onboard sensors available the vehicle, source location, destination location, vehicle configuration information, and so forth. Further, the vehicle may receive, from the data analytics platform, information about one or more optimal routes selected by the data analytics platform for reaching the destination location, with the optimization performed by the data analytics platform being based at least in part on selecting a route that is determined to be both safe and fuel-efficient.

Some examples herein include a data analytics platform that selects an optimally safest route for a particular vehicle based on consideration of onboard sensors available on the particular vehicle, road features of different candidate routes, vehicle dynamics of the particular vehicle, and so forth. Additionally, the data analytics platform may be configured to perform route selection by also taking into consideration fuel-efficiency when selecting a route for the particular vehicle. As mentioned above, the vehicle may be connected with the data analytics platform, such as via one or more networks, and may share information about the vehicle's onboard sensors and other vehicle information. In addition, the vehicle may provide a source location and a destination location to the data analytics platform. In some examples, when a destination location is not specified, the data analytics platform may predict the destination location, such as based on a previous driving history associated with the vehicle stored in a database or other data structure maintained by the data analytics platform.

As one example, after the destination location is determined (either based on received user input or prediction of the destination), the data analytics platform may analyze a plurality of candidate routes between the source location and the destination location, while taking into consideration capabilities of the sensors (e.g., cameras, radar, lidar, ultrasound, etc.) present on board the vehicle, such as sensor location, sensor range, sensor resolution, sensing directions, etc., depending at least in part on the type of sensor. Individual candidate routes may be divided into a plurality of road segments, and the data analytics platform may estimate a required field of view (FOV) of each road segment along the respective candidate route. For example, the required FOV may be the areas external to the vehicle that are predicted to be required to be monitored by a human driver or the vehicle sensors to ensure safe operation of the vehicle during navigation of the corresponding road segment.

In addition, the data analytics platform may determine a percentage of the required FOV of each road segment that is able to be covered by the onboard sensors of the vehicle, such as for maximizing the autonomous driving time to reduce the number of decisions made by a human driver. Accordingly, the data analytics platform may perform route selection to maximize the amount of autonomous driving time and reduce the dependency on vehicle operation by a human operator. The optimal route options may be based at least partially on the total amount of autonomous driving time, e.g., determined based on sensor capabilities and required FOVs. In some examples, after the highest ranked route options with respect to safety have been determined, the data analytics platform may determine which of these routes provides the maximum fuel efficiency, such as by considering vehicle dynamics, route configurations, route conditions, and so forth. The resulting optimal route may be selected as the optimally safest and efficient route for the particular vehicle.

The system herein may provide significant benefits for connected fully autonomous and semi-autonomous vehicles. The connected data analytics platform and connected application(s) executed on the vehicle provide improved safety and efficiency to vehicles and their occupants. The data analytics platform and connected application(s) enable real-time data and analytics exchange between vehicles and the data analytics platform. Furthermore, at least some of the algorithms disclosed herein may be executed by a computing device on the vehicle instead of, or in addition to, being executed at the remote computing device(s) hosting the data analytics platform.

Additionally, the vehicles herein are not limited to any particular sensor configurations. Examples of different types of sensors that may be employed in some examples include mono cameras, stereo cameras, infrared cameras, radar, lidar, GPS (Global Positioning System) receivers, ultrasonic sensors, and so forth. Accordingly, the sensors herein may be used to capture and integrate different sources and types of information. The environmental information around the vehicle captured by these sensors may be used as input information to a vehicle controller that may be configured to intelligently control the vehicle, such as for preventing collisions, reducing fuel consumption, and increasing the convenience and safety of vehicle occupants.

In some examples, the data analytics platform may perform real-time operations to improve safety and efficiency of a connected vehicle. For instance, the data analytics platform may include a plurality of interconnected modules which, in some cases, may employ machine learning or other artificial intelligence algorithms to provide information to vehicles such as for improving safety, efficiency, and comfort. Furthermore, a connected application executed at the vehicle computing device may assist the vehicle in determining a safest and most efficient route considering the vehicle configuration and the vehicle sensor configuration.

Implementations herein may significantly improve the performance of a fully/partially autonomous vehicle using connected data. The connected vehicle is able to share data with the data analytics platform, which provides access to cloud databases and cloud computing power, Web-based sources of information, as well as providing access to information provided by other vehicles. Further, in some cases connected vehicles may communicate directly with other vehicles connected to the data analytics platform, such as via any of various communication protocols including dedicated short-range communications (DSRC), cellular communications, or the like. Thus, the connected vehicle herein may receive data from other sources for realizing improved vehicle control, safety, comfort, efficiency, and the like. Similarly, the connected vehicles herein may send data to other data sources or users, which may be used, e.g., to determine traffic congestion, road features, vehicle performance, create road databases, etc.

For discussion purposes, some example implementations are described in the environment of selecting and navigating a route (travel path) for a vehicle based on sensor capabilities, as well as other considerations such as vehicle capabilities, local conditions, projected fuel expenditure, and so forth. However, implementations herein are not limited to the particular examples provided, and may be extended to other types of sensing devices, other types of vehicles, other types communications, other types of databases, other types of computing platforms and architectures, and so forth, as will be apparent to those of skill in the art in light of the disclosure herein.

FIG. 1 illustrates an example route selection and vehicle navigation system according to some implementations. The system 100 includes a vehicle 102 having one or more vehicle computing devices 104 able to communicate over one or more networks 106 with one or more service computing devices 108. The vehicle 102 may further include one or more sensors 112 and one or more vehicle systems 114 that are in communication with the vehicle computing device(s) 104, such as via a CAN bus (controller area network bus) (not shown in FIG. 1) or the like.

Each vehicle computing device 104 may include one or more processors 116, one or more computer-readable media 118, one or more communication interfaces (I/Fs) 120, and one or more vehicle human-machine interfaces (HMIs) 122. In some examples, the vehicle computing device(s) 104 may include one or more ECUs (electronic control units) or any of various other types of computing devices. For instance, the computing device(s) 104 may include one or more ADAS/AD ECUs for controlling at least some of the vehicle systems 114, such as to perform ADAS and/or AD tasks, such as navigation, braking, steering, acceleration, deceleration, and so forth. The computing device(s) 104 may also include one or more other ECUs, such as for controlling other systems of the vehicle systems 114.

"ECU" is a generic term for any embedded processing system that controls one or more of the systems, subsystems, or components in a vehicle. Software, such as a vehicle control program 124 and a route selection program 126 may be executed by one or more ECUs and may be stored in a portion of the computer-readable media 118 (e.g., program ROM, solid state storage, etc., as discussed below) associated with the respective ECU to enable the ECU to operate as an embedded system. ECUs may typically communicate with each other over a vehicle bus, such as the CAN bus mentioned above, according to a vehicle bus protocol. As an example, the CAN bus protocol is a vehicle bus protocol that allows ECUs and the vehicle systems 114 to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 104 may include one or more processors 116, which may include one or more of central processing units (CPUs), graphics processing units (GPUs), microprocessors, microcomputers, microcontrollers, digital signal processors, state machines, logic circuits, and/or any devices that manipulate signals based on operational instructions. As one example, the processor(s) 116 may include one or more hardware processors and/or logic circuits of any suitable type specifically programmed or configured to execute the algorithms and other processes described herein. The processor(s) 116 may be configured to fetch and execute computer-readable instructions stored in the computer-readable media 118, which may program the processor(s) 116 to perform the functions described herein.

The computer-readable media 118 may include volatile and nonvolatile memory and/or removable and non-removable media implemented in any type of technology for storage of information, such as computer-readable instructions, data structures, programs, program modules, and other code or data. For example, the computer-readable media 118 may include, but is not limited to, RAM, ROM, EEPROM, flash memory or other memory technology, optical storage, solid state storage, magnetic disk, network-attached storage, cloud storage, or any other medium that can be used to store the desired information and that can be accessed by a computing device. Depending on the configuration of the vehicle computing device(s) 104, the computer-readable media 118 may be a tangible non-transitory medium to the extent that, when mentioned, non-transitory computer-readable media exclude media such as energy, carrier signals, electromagnetic waves, and/or signals per se. In some cases, the computer-readable media 118 may be at the same location as the vehicle computing device 104, while in other examples, a portion of the computer-readable media 118 may be remote from the vehicle computing device 104.

The computer-readable media 118 may be used to store any number of functional components that are executable by the processor(s) 116. In many implementations, these functional components comprise instructions or programs that are executable by the processor(s) 116 and that, when executed, specifically program the processor(s) 116 to perform the actions attributed herein to the vehicle computing device 104. Functional components stored in the computer-readable media 118 may include the vehicle control program 124 and the route selection program 126, each of which may include one or more computer programs, applications, executable code, or portions thereof. Further, while these programs are illustrated together in this example, during use, some or all of these programs may be executed on separate vehicle computing device(s) 104. Alternatively, in some examples, each of these programs 124 and 126 may be part of a single program.

In addition, the computer-readable media 118 may store data, data structures, machine-learning models, and other information used for performing the functions and services described herein. For example, the computer-readable media 118 may store sensor configuration information 128 that includes information about the sensor type, field of view, resolution, range and other capabilities, current status and operability, and so forth, of the sensors on board the vehicle. Further, the computer-readable media 118 may store vehicle configuration information 130 that includes information about the vehicle, such as powertrain information, suspension information, tire information, as well as vehicle brand, model, year, trim level, and the like. Additionally, the computer-readable media 118 may store, at least temporarily, sensor data 132 received from the onboard sensors 112, and which may include information about landmarks detected during a trip, vehicle location information, and so forth.

Further, while the functional components, data and data structures are illustrated together in this example, during use, some or all of these elements may be stored on or by separate ones of the computing device(s) 104. The computing device(s) 104 may also include or maintain other functional components and data, which may include programs, drivers, etc., and the data used or generated by the other functional components. Further, the computing device(s) 104 may include many other logical, programmatic, and physical components, of which those described above are merely examples that are related to the discussion herein.

The one or more communication interfaces 120 may include one or more software and hardware components for enabling communication with various other devices, such as over the CAN bus and/or over one or more network(s) 106. For example, the communication interface(s) 120 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, and the like, as additionally enumerated elsewhere herein.

The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH® or DSRC; a wired network, including fiber optics and Ethernet; any combination of the foregoing, or any other suitable communication network. Components used for such communication technologies can depend at least in part upon the type of network, the environment selected, or both. Protocols for communicating over such networks are well known and will not be discussed herein in detail.

The sensor data 132 may include sensor data received from the onboard sensors 112. For example, the onboard sensors 112 may include any of a plurality of different types of sensors such as a camera system, radar, LIDAR, ultrasound, a global navigation satellite system (GNSS) receiver (referred to hereinafter by the common usage name "GPS", which is also intended to be inclusive of any other satellite navigation system), accelerometers, a compass, and the like. In addition, the sensor data 132 used by the vehicle control program 124 may include information received from or associated with various vehicle systems 114, such as (not shown in FIG. 1) from a suspension controller associated with the suspension system, a steering controller associated with the steering system, a vehicle speed controller associated with a braking and acceleration system, and so forth.

For example, the vehicle control program 124 may use rule-based and or artificial-intelligence-based control algorithms to determine parameters for vehicle control. For instance, the vehicle control program 124 may determine an appropriate action, such as braking, steering, accelerating, or the like, and may send one or more control signals to one or more vehicle systems 114 based on the determined action. For example, the vehicle control program 124 may send control signals to the suspension controller, the steering controller, and/or the vehicle speed controller for controlling or partially controlling the vehicle in some applications.

The human-machine interface(s) 122 may include any suitable type of input/output devices, such as buttons, knobs, joysticks, touchscreens, speakers, microphones, voice recognition and artificial speech technology, in-cabin sensors, such as eye monitoring cameras, vital sign monitors, and so forth. As one example, a vehicle occupant may use a human-machine interface 122 to indicate a destination location, such as via voice command or touchscreen inputs. Implementations herein are not limited to any particular type of human-machine interfaces 122.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 108 as being present in a single location, these components and data may alternatively be distributed across different computing devices and different locations in any manner. Consequently, the functions may be implemented by one or more service computing devices, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 140, one or more computer-readable media 142, and one or more communication interfaces 144. Each processor 140 may be a single processing unit or a number of processing units, and may include single or multiple computing units or multiple processing cores. The processor(s) 140 can be implemented as one or more microprocessors, microcomputers, microcontrollers, digital signal processors, central processing units, state machines, logic circuitries, and/or any devices that manipulate signals based on operational instructions. For instance, the processor(s) 140 may be one or more hardware processors and/or logic circuits of any suitable type specifically programmed or configured to execute the algorithms and processes described herein. The processor(s) 140 can be configured to fetch and execute computer-readable instructions stored in the computer-readable media 142, which can program the processor(s) 140 to perform the functions described herein.

The computer-readable media 142 may include volatile and nonvolatile memory and/or removable and non-removable media implemented in any type of technology for storage of information, such as computer-readable instructions, data structures, program modules, or other data. Such computer-readable media 142 may include, but is not limited to, RAM, ROM, EEPROM, flash memory or other memory technology, optical storage, solid state storage, magnetic tape, magnetic disk storage, storage arrays, network-attached storage, storage area networks, cloud storage, or any other medium that can be used to store the desired information and that can be accessed by a computing device. Depending on the configuration of the service computing device 108, the computer-readable media 142 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 142 may be used to store any number of functional components that are executable by the processors 140. In many implementations, these functional components comprise instructions or programs that are executable by the processors 140 and that, when executed, specifically configure the one or more processors 140 to perform the actions attributed above to the service computing device 108. Functional components stored in the computer-readable media 142 may include a navigation information program 146 that may be executed to configure the service computing device 108 to determine and send navigation information, such as routing information, to the vehicle computing device 104. For example, the navigation information program 146 may include one or more descriptive analytics modules 148, one or more predictive analytics modules 150, and one or more prescriptive analytics modules 152, which may be executed for determining optimal route for a vehicle as well as for performing other functions.

Examples of descriptive analytics modules 148 may include modules that perform communications, encryption/decryption, data filtering, data fusion, and candidate route prediction and monitoring. Examples of predictive analytics modules 150 may include destination prediction, candidate route prediction and monitoring, speed profile determination, and anomaly prediction. Examples of prescriptive analytics modules 152 may include modules for managing safety, efficiency, comfort, and the like of vehicles and/or vehicle occupants. For example, the prescriptive analytics modules 152 may include modules for managing road anomalies, driver behavior, determining a drive horizon, determining efficient adaptive cruise control (ACC) operation, determining suspension control, determining occupant stress levels, and the like.

In addition, the computer-readable media 142 may store or access data used for performing the operations described herein. Further in some examples, the data may be stored in any suitable type data structures such as in one or more databases 154. Examples of databases 154 may include a map data database 156, a time series data database 158, an image data database 160, and a vehicle data database 162. For example, the map data database 156 may include information related to a required FOV for selected road segments, road profiles, high definition maps, and standard maps for various geographic regions. Furthermore, the time series data database 158 may include information such as traffic data, weather data, vehicular communication data, vehicle CAN data, sensor data, and so forth. Additionally, the image data database 160 may maintain images of roads, landmarks, intersections, and the like, such as may be received from infrastructure cameras, cell phone cameras, vehicle-mounted cameras, and so forth. In addition, the vehicle data database 162 may include information about each vehicle that uses the system 100, which may include vehicle identification information to use for communicating with the vehicle, sensor configuration information 128, vehicle configuration information 130, past destinations of the vehicle or vehicle occupants, information about an owner or other occupant associated with the vehicle, such as an occupant profile including occupant information and preferences, and so forth.

Further, the service computing device 108 may also include or maintain other functional components and data not specifically shown in FIG. 1, which may include programs, drivers, etc., and the data used or generated by the functional components. Additionally, the service computing device 108 may include many other logical, programmatic, and physical components, of which those described above are merely examples that are related to the discussion herein. Examples of machine-learning models (MLMs) that may be used in some examples of the modules 148, 150 and/or 152 herein, such as for the AI-based algorithms and models, may include predictive models, decision trees, classifiers, regression models, such as linear regression models, support vector machines, stochastic models, such as Markov models and hidden Markov models, and artificial neural networks, such as self-organizing neural networks, recurrent neural networks, convolutional neural networks, modular neural networks, deep-learning neural networks, and so forth.

The communication interface(s) 144 may include one or more interfaces and hardware components for enabling communication with various other devices, such as over the network(s) 106. For example, communication interface(s) 144 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, DSRC, and the like, as additionally enumerated elsewhere herein.

In addition, the service computing device(s) 108, and in some cases, the vehicle computing device(s) 104 may be able to communicate over the one or more networks 106 with one or more information source computing devices, such as web servers, service provider computing devices, public databases, private databases, or the like. Information source computing devices illustrated in this include one or more map provider computing device(s) 164 which may provide map data 166 to the service computing devices 108 and/or to the vehicle computing devices 104. Additionally, one or more OEM (original equipment manufacturer) computing devices may provide OEM information 170 about vehicles that they manufacture and/or may receive information about their vehicles from the service computing devices 108. Further, one or more government computing devices 172 may provide government data 174, such as road information, department of motor vehicle information, construction information, and so forth.

The information source computing device(s) 164, 168 and 172 may include hardware and software configurations similar to the service computing devices 108 described above, but with different functional components and data stored thereon or associated there with. Further, while several types of information source computing devices are described herein, numerous other types of information source computing devices may provide information to the service computing devices 108 and/or the vehicle computing devices 104. For example, the information source computing devices may provide local condition data to the service computing device(s) 108 for indicating the current conditions of specified road segments, such as with respect to weather conditions, traffic, road closures, special events, and so forth.

In addition, a user computing device 180 may execute one or more user applications 182 for providing information and/or instructions to the service computing device 108. For instance, the user computing device may be a mobile device such as a cell phone, smart phone, tablet, wearable device, or the like that may be used to communicate directly with the service computing device 108 over the one or more networks 106. As one example, the user application 182 may include a browser and the user may use the browser to interact with the service computing device 108 such as for setting preferences, providing information about the vehicle 102, providing information about the user, or the like, via a web application, website, or other suitable user interface.

As one example, the vehicle computing device 104 may provide, to the service computing device 108, source and destination information 184 for a trip. For example, the route selection program 126 may be executed by the vehicle computing device 104 to send to the service computing device 108 the source location and destination location for desired travel. In addition, the vehicle computing device 104 may provide the sensor configuration information 128 and/or vehicle configuration information 130 to the service computing device 108 if the service computing device 108 does not already possess this information in the vehicle data database 162. Alternatively, in other examples, the vehicle computing device 104 may merely provide source location information to the service computing device 108 and may request a route from the service computing device 108. In response, the service computing device may predict a destination location such as based on a current time and current location and an analysis of past trips made by the vehicle 102. As still another example, the service computing device 108 may send a communication to cause the human machine interface 122 to query the vehicle occupant as to a destination location.

As discussed in additional detail below, the service computing device 108 may execute the navigation information program 146 to determine an optimal route for the vehicle 102 from the source location to the destination location. For example, the service computing device may execute the descriptive analytics module(s) 148, the predictive analytics module(s) 150, and the prescriptive analytics module(s) 152 to determine the optimal route. Upon determining the optimal route(s), the service computing device 108 may send the selected optimal route(s) 186 to the vehicle computing device 104. The vehicle control program 124 may be executed by the vehicle computing device 104 to navigate the vehicle according to the optimal route(s) 186. Details of determining and selecting the optimal route(s) 186 are discussed additionally below with respect to FIGS. 2-19.

To realize benefits of connected vehicle technologies for partially/fully autonomous vehicles, the connected data analytics platform 145 may receive various different types of the data from different sources such as vehicles 102, infrastructure cameras and other sensors, cellphones, other transportation data services, and so forth, as discussed above. The data analytics platform 145 may process the received data to derive value for end users by using various different modules categorized in analytics layers, such as the descriptive analytics module(s) 148, predictive analytics module(s) 150, and prescriptive analytics module(s) 152. The descriptive analytics modules 148 may include multiple modules used for data processing, authentication, data filtering, data fusing, and so forth. The predictive analytics module(s) 150 may be used to predict different features expected for vehicle control, such as vehicle speed, route, anomaly prediction, and the like, such as by employing AI algorithms, simulation programs, and so forth. The prescriptive analytics modules 152 may include AI modules that provide values to various end users based on their respective requirements for safety, efficiency, comfort, and the like. Accordingly, the data analytics platform 145 may provide values based on user inputs and/or prediction. Furthermore, while three different types of modules are described in the example of FIG. 1, fewer or more types of modules may be employed in other examples of the system herein.

Furthermore, different connected applications may be provided to end users for providing various different types of services in addition to or in alternative to route planning. For example, the data analytics platform 145 may provide road anomaly and driver behavior information for analyzing and making determinations with respect to vehicle occupant safety. In addition, drive horizon may be used by the data analytics platform for determining efficiency, such as by suggesting an optimal vehicle travel speed for a particular route to achieve fuel-savings, such as based on available data road profile, traffic, vehicle powertrain, other vehicle configuration data, and so forth. Further, the data analytics platform 145 may share aggregated vehicle data from a plurality of vehicles to other third party entities such as OEMs, and may also enable data to be ingested ingest data from third party entities such as map providers, weather information providers, or the like.

In the system 100, the route selection program 126 includes communications capability for connecting to the data analytics platform 145. Further, the route selection program 126 may determine the vehicle's current location from the onboard sensors 112 such as via a GPS receiver or the like. Accordingly, the route selection program 126 may be executed to transmit information about vehicle's current location, onboard sensor configuration information 128, and vehicle configuration information 130 such as, powertrain, trim level, etc. to the data analytics platform 145. The data analytics platform 145 executes the navigation information program 146 to process the vehicle information and, if the destination location has been received from the vehicle computing device 104, the descriptive analytics module(s) 148 may be is used to determine the candidate routes from the source location to the destination location. On the other hand, if the destination location cannot be determined from the information received from the vehicle computing device 104, then the predictive analytics module(s) 150 may be executed to predict the desired destination of the vehicle occupant, such as based on stored vehicle history in the vehicle data database 162. After the destination location is decided either from received inputs or based on prediction, the candidate routes may be determined as discussed additionally below, e.g., with respect to FIG. 5.

Figure 2:
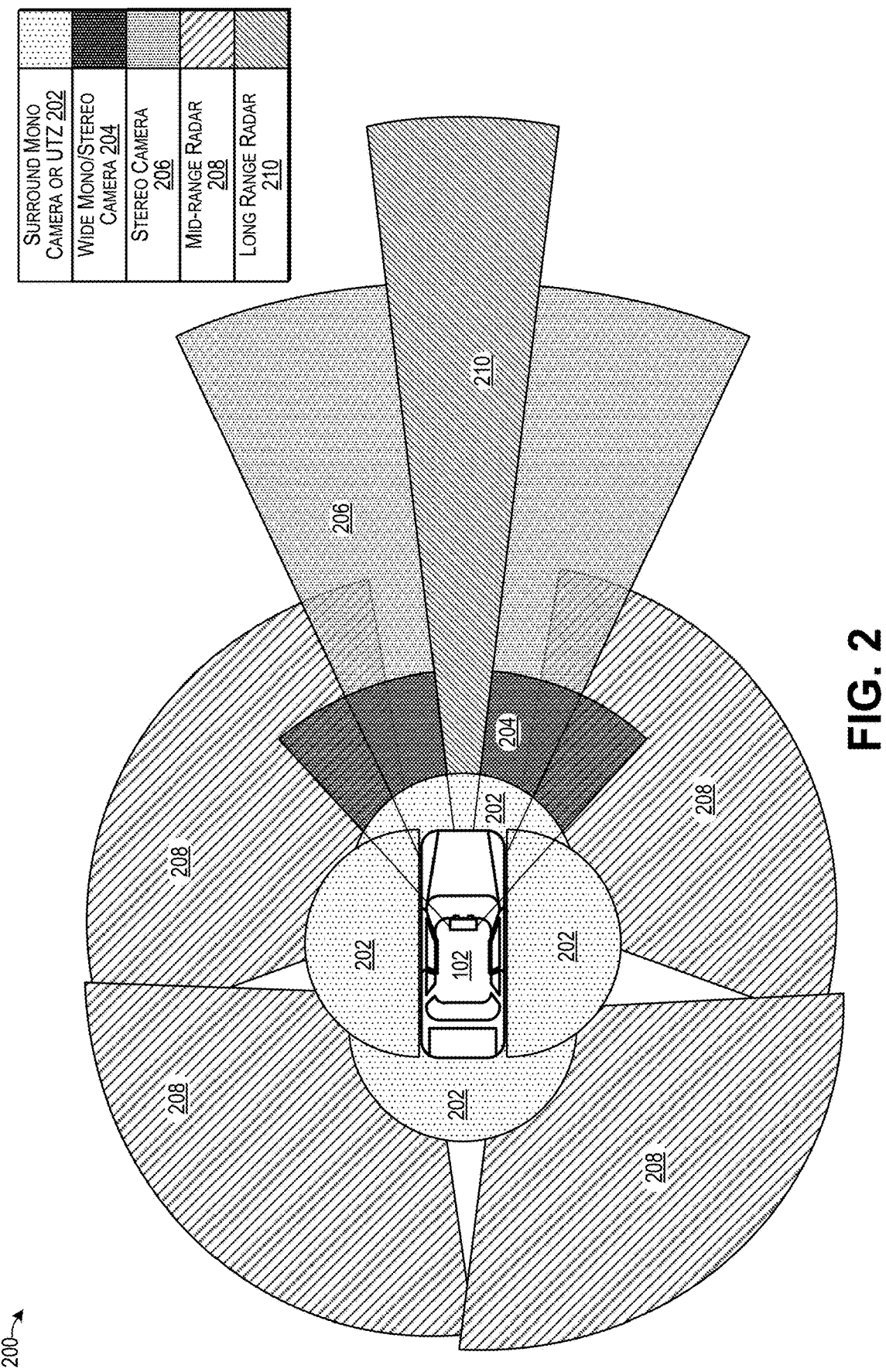
FIG. 2 illustrates an example of onboard sensor coverage for the vehicle according to some implementations.

FIG. 2 illustrates an example of on-board sensor coverage 200 for the vehicle 102 according to some implementations. The vehicle 102 may be equipped with a wide range of sensors to detect and recognize roads, obstacles, signs, landmarks and the like along the travel path of the vehicle, as well as to navigate and avoid any collisions while partially or fully autonomous. For instance, as defined by the Society of Automotive Engineers (SAE), there are six levels of driving automation from Level 0 to Level 5. In particular, at "Level 0" (no driving automation) the driver performs all operating tasks like steering, braking, accelerating, and so forth. At "Level 1" (driver assistance), the vehicle can assist with some functions (e.g., cruise control), but the driver still handles all accelerating, braking, and monitoring of the surrounding environment. At "Level 2" (partial driving automation), the vehicle may assist with steering or acceleration functions and allow the driver to disengage from some of their tasks. Adaptive cruise control (ACC) is one example of Level 2 autonomy.

The concept of autonomous driving mainly starts from "Level 3" (conditional driving automation), in which the vehicle itself may monitor the surroundings and may exert some control over the vehicle (e.g., autonomous parking). At Level 3, a driver must be able to take over. At "Level 4" (high driving automation) a vehicle may be able to drive independently most of the time but will not operate unless all conditions are met. At "Level 5" (full driving automation) the vehicle is able to drive anywhere in all conditions. There is no need for pedals or a steering wheel, as the autonomous vehicle system controls all critical tasks, monitors the surroundings, and identifies unique driving conditions, such as traffic jams, obstacles, road closures, and so forth.

For the higher levels of automation (i.e., Level 3 to Level 5), the vehicle 102 may continuously monitor 360 degrees around the vehicle 102 to avoid any obstacles and navigate safely. There are various different kinds of sensors and sensing techniques that may be used for the vehicle 102. Commonly used sensors may include mono cameras, stereo cameras, infrared cameras, radar, lidar, lasers, ultrasonic sensors, GPS receivers, and so forth. For any specific driver assistance system application or any specific level of driving automation, the sensors may be selected based on the advantages and disadvantages of the sensor type, which may include detection range, type of detection ability, power requirements, cost, amount of data generated, and the like. Each sensor type may have advantages and disadvantages, and thus, different types of sensors may be combined in use on the vehicle 102 for improving accuracy in various weather or other types of conditions. For example, a single sensor type might not be able to meet recognition accuracy or range requirements in certain weather conditions.

As one example, a camera (mono/stereo) might not perform well in the dark or during inclement weather conditions, and the detection range may be comparatively low as compared to similarly priced radar sensors. However, a radar sensor might not be able to detect a human in the roadway and may have difficulty in detecting lane markers. On the other hand, a radar sensor may be a good candidate for long-range detection of other vehicles, as compared to other sensor types. As another example, an infrared camera may perform well under night conditions, but may also suffer from poor long-distance-detection capability. Additionally, a lidar sensor may perform well under night and day conditions, but may be costly and may generate huge amounts of data that may require a high capacity processor to process the data in real time. Further, while ultrasonic sensors are lower in cost than some other types of sensors, the detection range of ultrasonic sensors may be 10 meters or less, which may limit their usefulness. In view of the foregoing, multiple different sensor types are typically employed for ADAS/AD vehicles to continuously monitor the vehicle surroundings.

In the example of FIG. 2, the vehicle 102 is equipped with multiple different sensors for 360-degree monitoring of the vehicle surroundings. In this example, the vehicle 102 may be equipped with four surround mono cameras or ultrasound (UTZ) sensors, each a having a respective approximate detection area 202 (front, back, left side, right side) as shown in FIG. 2. For example, mono cameras may have a sensing range of up to 10 m and may be useful for parking assistance, detecting close proximity obstacles and/or detecting pedestrians.

The vehicle 102 may also be equipped with a forward-facing wide-angle mono or stereo camera having an approximate detection area 204 in front of the vehicle 102. In addition, the vehicle 102 may be equipped with a forward-facing stereo camera having an approximate detection area 206 in front of the vehicle 102. Stereo camera-based vision sensing systems may be used for short/medium to long range recognition applications, such as for identifying and tracking different obstacles, landmarks, pedestrians, road signs, road features, traffic lights, etc., such as by using disparity maps or the like. Camera based sensing may be significantly affected by environmental conditions such as snow, rain, sun light, darkness, etc.

Further, the vehicle 102 may be equipped with four mid-range radar sensors have respective approximate detection areas 208 surrounding the vehicle 102. Additionally, the vehicle 102 may be equipped with a long range radar sensor having an approximate detection area 210 in front of the vehicle 102. The radar sensors herein may employ milli-wave detection and ranging, and therefore may be robust to weather conditions, and may have a relatively long range of up to 250 m. However, radar-based measurements may lack detailed geometric information such as shape and size of an obstacle. In some examples, mid-range radar sensors may be useful for applications such as blind-spot assistance and emergency braking ADAS functions.

In some cases, a lidar sensor may be used in place of, or in addition to, one or more of the stereo camera, the long-range radar, or others of the above-discussed sensors. Further, while several example sensor configurations are discussed with respect to FIG. 2, numerous other sensor types, sensor locations, and sensor configurations will be apparent to those of skill in the art having the benefit of the disclosure herein. Accordingly, implementations herein are not limited to any particular sensor types, locations, or configurations.

In addition, with the onboard sensors herein, the vehicle 102 may be equipped with connected devices to share data with other vehicles, infrastructure, road edge computing modules, cloud data exchange, the analytics platform 145, and so forth. Generally, fully and partially autonomous vehicles that share data with other vehicles and systems may be referred to as a connected autonomous vehicle. Connected autonomous vehicles may receive data from the other sources as mentioned above and may process the received data to realize improve safety, comfort, efficiency, reduced travel times, and the like. Furthermore, connected vehicles may share the data with others to realize traffic density, road usage, etc., as well as provide different values to other vehicles.

Figure 3:
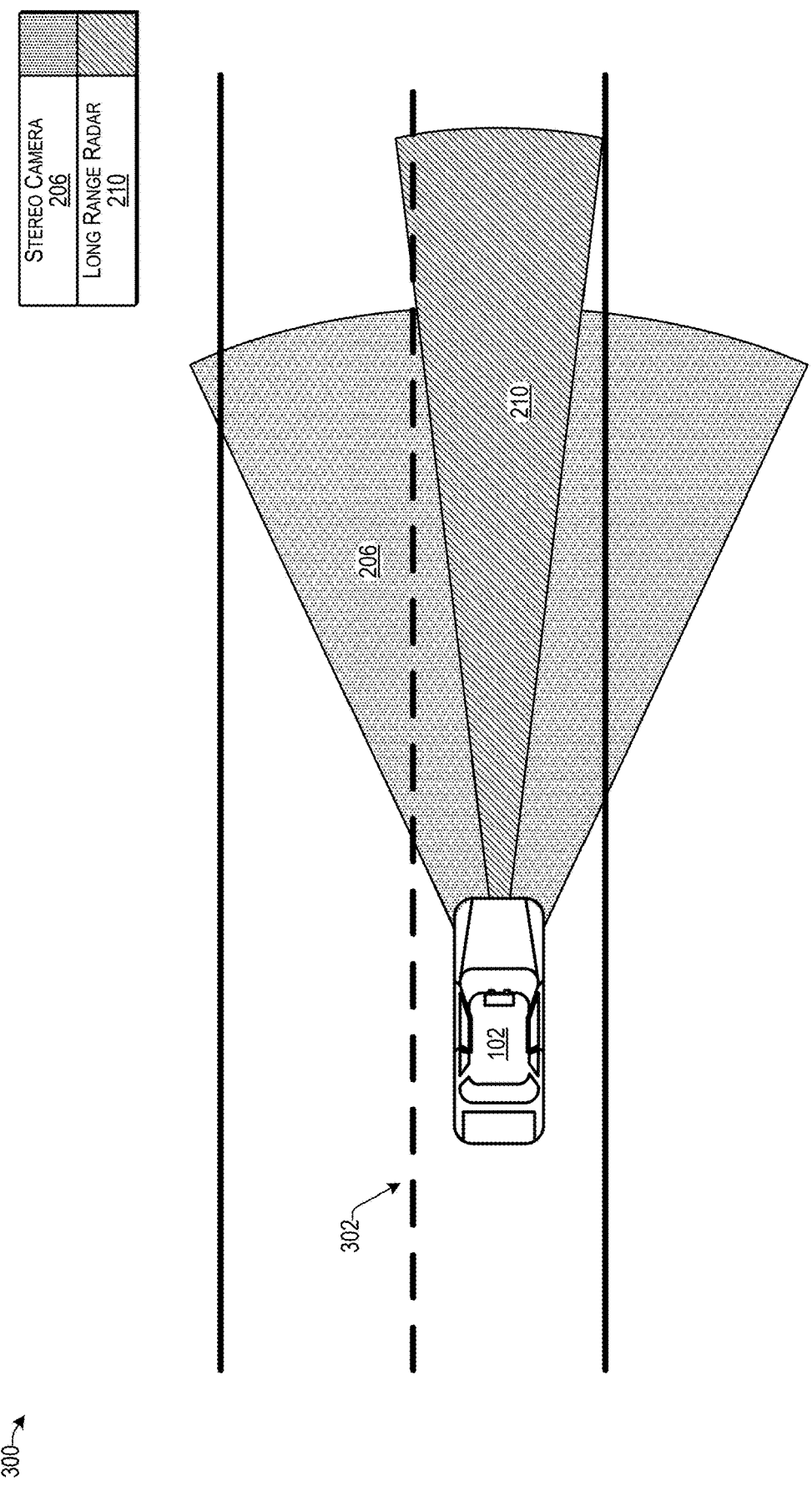
FIG. 3 illustrates an example sensor usage configuration for a lane keep assist (LKA) system according to some implementations.

FIG. 3 illustrates an example sensor usage configuration 300 for a lane keep assist (LKA) system according to some implementations. For instance, ADAS applications for lateral and longitudinal driver assist system such as LKA and adaptive cruise control (ACC) are relatively mature technologies that are available in production vehicles. These systems typically use single or multiple sensors to ensure safe and robust performance. The type and number of sensors employed on a vehicle may vary based on the type of the ADAS application.

In the example of FIG. 3, the LKA system may be employed for lane departure warning and lateral collision avoidance. For instance, the LKA system may assist the driver in safely maintaining the vehicle 102 in its own lane. Accordingly, in this example, the sensor usage configuration includes the stereo camera providing the detection area 206 and the long-range radar providing the detection area 210. For example, the long-range camera's detection area 210 provides a FOV able to measure road curvature and provide localization of the vehicle 102 within its lane 302. In some examples, the LKA system may include an actuator (not shown in FIG. 3) to provide haptic feedback to the driver by vibration to the driver seat, steering wheel, or the like. Thus, the LKA system may support the driver by providing alerts of lane departure, and the driver may then be responsible for taking control of the vehicle 102 and avoiding further lane departure.

Additionally, in some examples herein, rather than relying on driver response when lane departure occurs, the LKA system may employ sensor fusion from the long-range camera and the long-range radar to alert the driver and also activate the steering actuator. Accordingly, the steering actuator may be automatically engaged to return the vehicle to its proper lane. The sensor fusion algorithms may be required to meet strict performance and safety requirements.

Figure 4:
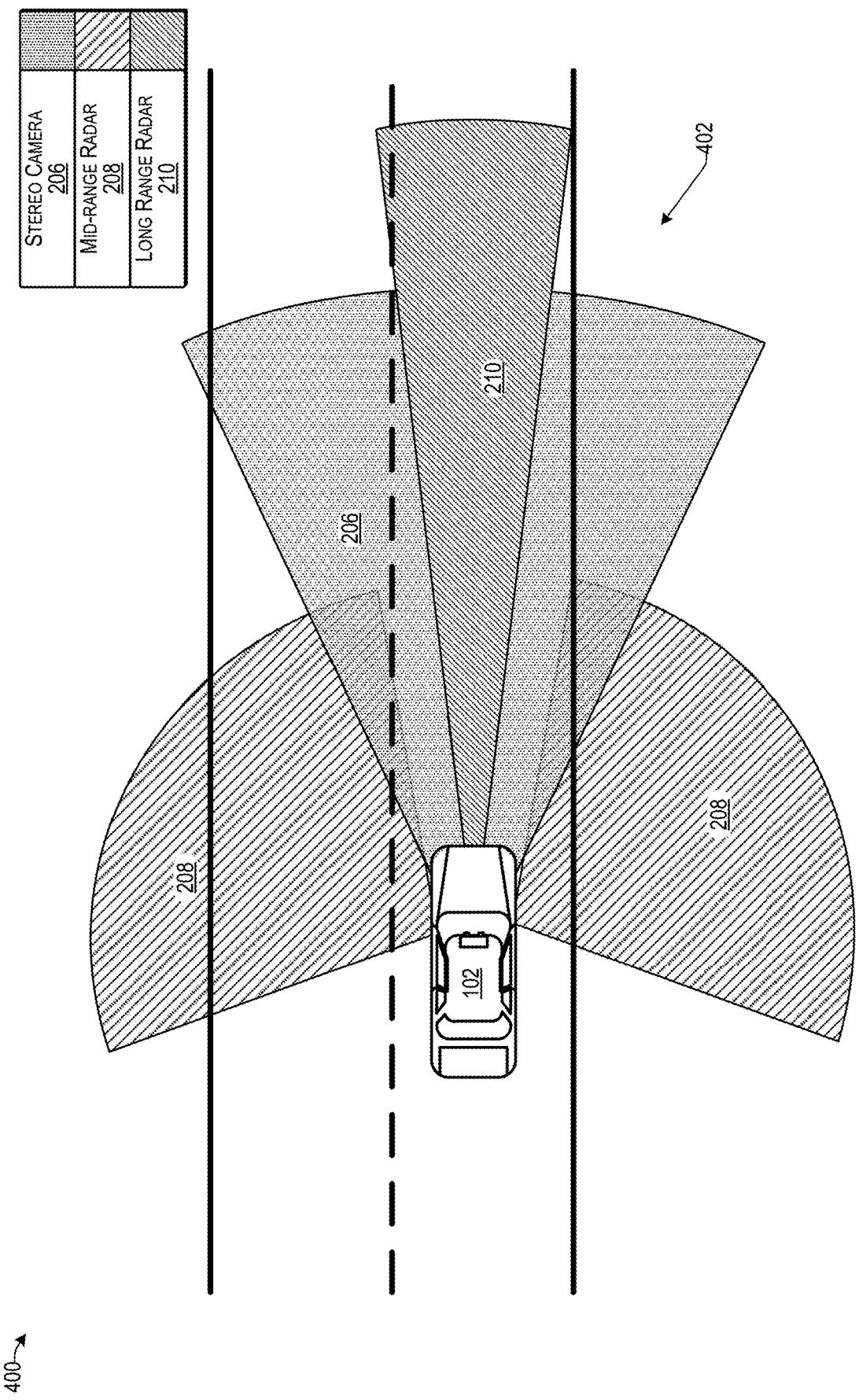
FIG. 4 illustrates an example sensor usage configuration for adaptive cruise control (ACC) according to some implementations.

FIG. 4 illustrates an example sensor usage configuration 400 for adaptive cruise control (ACC) according to some implementations. Adaptive cruise control (ACC) has a broader scope of longitudinal control functions than LKA systems and may be employed for front collision avoidance, traffic jam assistance in stop-and-go scenarios, as well as maintaining a proper following distance behind another vehicle during highway driving. The ACC system may automatically adjust the vehicle's speed and headway distance from the preceding vehicle. When the ACC system is engaged, the ACC system may ensure safe following distance and speed to aid the driver in avoiding accidents related to excessive speed or too short following distance. In the examples herein, the sensor configuration 400 for the ACC system may include a long-range radar with coverage area 210 having a long range FOV, two medium range radars with forward and side coverage areas 208 for obstacle detection with wide FOV, and the long range camera with the coverage area 206 having an FOV selected for lane detection and roadway detection. Accordingly, in this example, the coverage areas 206, 208 and 210 together may represent the vehicle sensor FOV 402 in the forward direction.

Figure 5:
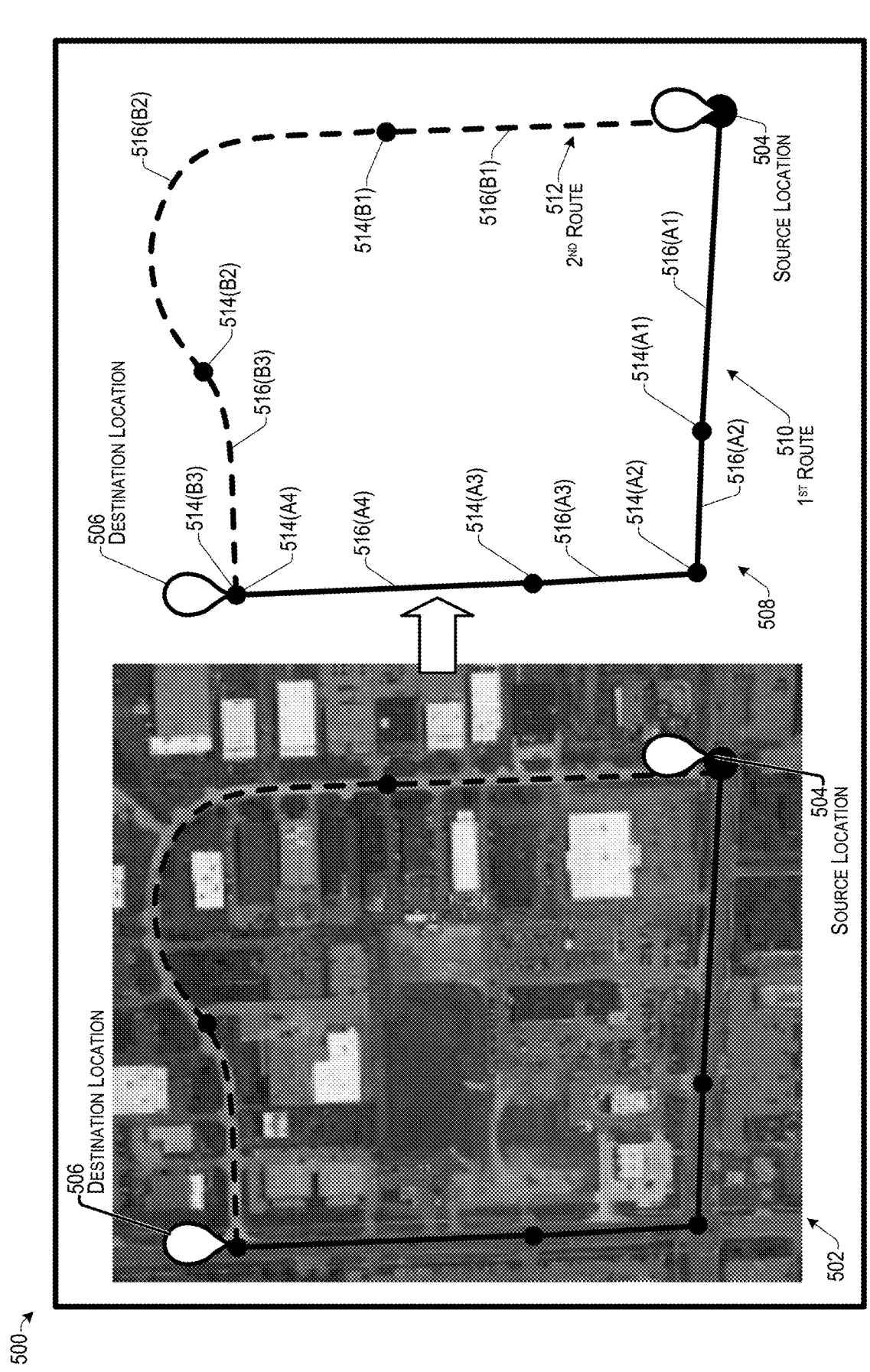
FIG. 5 illustrates an example of determining candidate routes between a source location and a destination location according to some implementations.

FIG. 5 illustrates an example 500 of determining candidate routes between a source location and a destination location according to some implementations. In this example, as shown on a map 502, a source location 302 and a destination location 304 may be initially determined, e.g., as discussed above and as discussed additionally below. For example, after the source location 504 the destination location 506 have been set, a plurality of feasible candidate routes 508 may be determined. In this example, two feasible candidate routes 508 are illustrated, namely a first route 510 and a second route 512. In other examples, more or fewer candidate routes may be determined. In addition, in the case that there are a very large number of feasible candidate routes, the number of candidate routes may be narrowed using any of various thresholds such as estimated distance traveled along each route, estimated time of travel for each route, or the like. In some cases, the narrowing criteria may be based at least in part on user preferences.

Each route 510 and 512 may be divided based on nodes 514 and intervening road segments 516 which are the distance between two nodes 514. The locations of the nodes 514 and the length of each road segment 516 may depend in part on the types of roads to be traverses. For instance, road segments may vary from a few meters to several hundred meters. In some cases nodes may correspond to intersections however this is not necessarily always the case, such as in the case of long stretches of road that may be broken into shorter road segments.

In the illustrated example, the first route 510 is divided into four road segments including nodes 514(A1), 514(A2), 514(A3), and 514(A4), and road segments 516(A1), 516 (A2), 516(A3), and 516(A4). In addition, the second route 512 is divided into three road segments including nodes 514(B1), 514(B2), and 514(B3), and road segments 515 (B1), 516(B2), and 516(B3). As mentioned above, in other examples, a different number of road segments might be used for each of the routes 510, 512. Furthermore, while the map 502 is illustrated in FIG. 5 for discussion purposes, in operation it may not be necessary for the service computing device 108 to generate a visual map for performing the identification and analysis of the selected routes and road segments.

The data analytics platform 145 may store in advance data for each node 514 and/or road segment 516 for all routes or at least most feasible routes within a geographic region. For example, the data analytics platform 145 may analyze maps of geographic regions in advance for determining routes and possible nodes and road segments on the roads included in each map. This information may be stored in the map data database 156 discussed above with respect to FIG. 1 in advance of receiving a request for route guidance from a vehicle.

Furthermore, for the determined road segments 516 identified in each map, the data analytics platform 148 may determine and store the required field of view (FOV) information for each respective road segment 516. The required FOV may include the 2D and/or 3D zone that should be monitored by a human driver or vehicle sensors when navigating on that respective road segment 516. For instance, an autonomous vehicle may be expected to monitor the required FOV areas for safely driving autonomously on the respective road segment. As with the road segments discussed above, the required FOV for each road segment may be predetermined and stored in advance in the map data database 156.

In this routing example, as discussed additionally below, for the first route 510 and the second route 512, the data analytics platform 145 may execute a route FOV coverage module in the prescriptive analytics layer to determine, for each route 510, 512, the percentage of required FOV that can be covered by the FOV of the vehicle sensors, i.e., the vehicle sensor FOV for the particular vehicle such as the vehicle sensor FOV 402 discussed above with respect to FIG. 4. The vehicle sensor FOV may be calculated by a vehicle sensor FOV module using the vehicle onboard sensor configuration information 128 received by the data analytics platform 145 for the vehicle 102. Examples of determining the required FOV for road segments and comparing vehicle FOV coverage to required FOV coverage are discussed additionally below with respect to FIGS. 6-11.

Furthermore, in addition to determining the FOV coverage for each candidate route, the data analytics platform 145 may further determine a drive horizon for each candidate route that may identify energy efficiency of the candidate routes by considering vehicle powertrain model and other vehicle information, road gradient, weather, traffic, and the like. In addition, the data analytics platform 145 may also determine predicted vehicle dynamics for each route. For example, the vehicle dynamics may indicate a predicted amount of dynamic forces that may be applied to a vehicle occupant while the vehicle traverses each route, such as by determining vehicle jerk, roll, pitch, yaw, crash safety, autonomous driving duration, and the like. The route FOV coverage results, the drive horizon results, and the vehicle dynamics results may be processed by an AI based optimal route selection module to select the optimal route for the particular vehicle.

Figure 6:
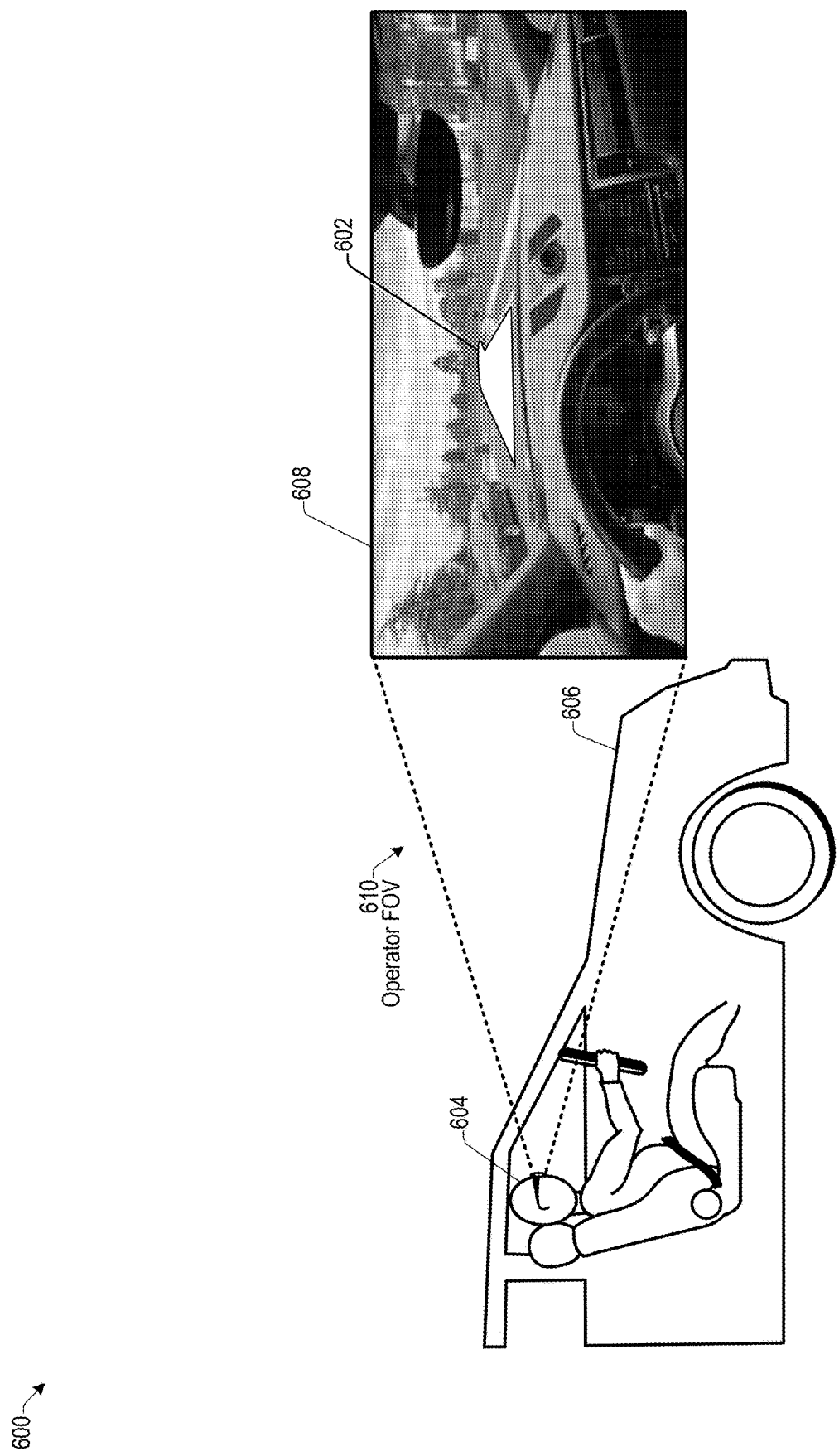
FIG. 6 illustrates an example of a required FOV for a road segment as viewed from the perspective of an operator of a vehicle according to some implementations.

FIG. 6 illustrates an example 600 of a required FOV 602 for a road segment as viewed from the perspective of an operator 604 of a vehicle 606 according to some implementations. In this example, the image 608 may represent the overall operator FOV 610 when looking straight ahead out of the windshield of the vehicle 606. Additionally, the white area in the image 608 represents the required FOV 602 for the road segment on which the vehicle 606 is currently traveling. Accordingly, in this example, the operator FOV 610 currently encompasses the required FOV 602.

Figure 7A:
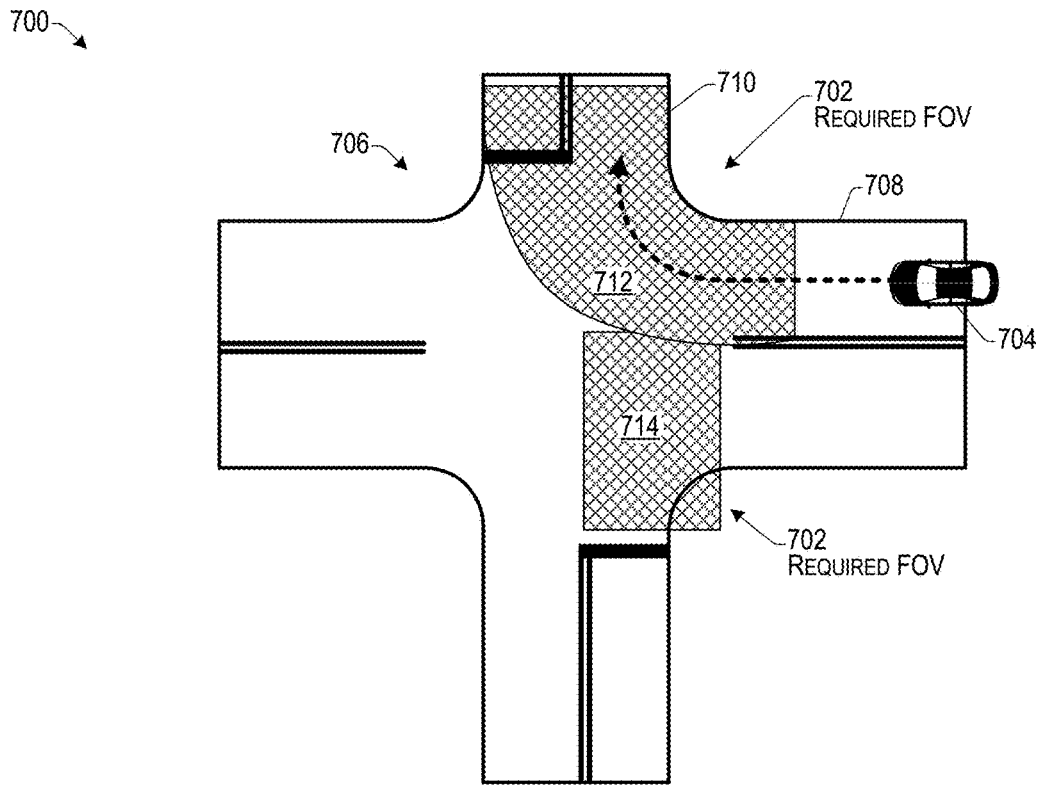
FIGS. 7A and 7B illustrate examples of determining the required FOV for a particular intersection according to some implementations.
Figure 7B:
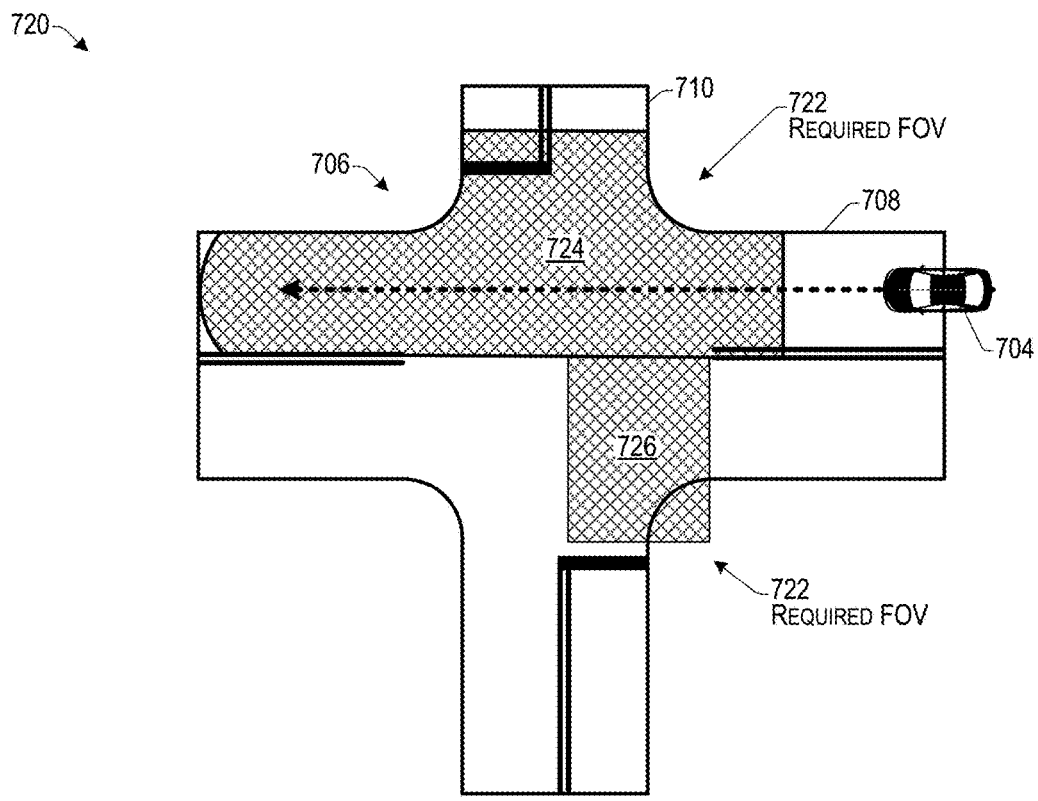

FIGS. 7A and 7B illustrate examples of determining the required FOV for a particular intersection according to some implementations. FIG. 7A illustrates an example 700 of determining the required FOV 702 for a vehicle 704 approaching an intersection 706 from the right side and making a right turn from a main street 708 onto a side street 710. In this example, there is not a traffic light or stop sign at the intersection 706 in the direction in which the vehicle 704 is approaching. Accordingly, for making the right turn at the intersection 706, a 2D representation of the required FOV 702 covers, but is not limited to, an area 712 that includes the portion of the main street 708 in front of the vehicle, and the portion of the side street 710 onto which the vehicle 704 will be turning. In addition, the required FOV 702 includes an area 714 in the left lane that may be checked to ensure that pedestrians or other vehicles are not crossing the intersection.

FIG. 7B illustrates an example 720 of determining the required FOV 722 for the vehicle 704 approaching the intersection 706 from the right side and proceeding through the intersection 706 along the main street 708. Further, in this example, there is not a traffic light or stop sign at the intersection 706 in the direction in which the vehicle 704 is approaching. Consequently, for proceeding through the intersection 706, a 2D representation of the required FOV 722 covers, but is not limited to, an area 724 that includes the portion of the main street 708 in front of the vehicle, and a small portion of the side street 710 to ensure that a vehicle or pedestrian is entering the intersection from the side street 710. In addition, the required FOV 722 may include an area 726 in the left lane that may be checked to ensure that pedestrians or other vehicles are not crossing the intersection 706.

Figure 8A:
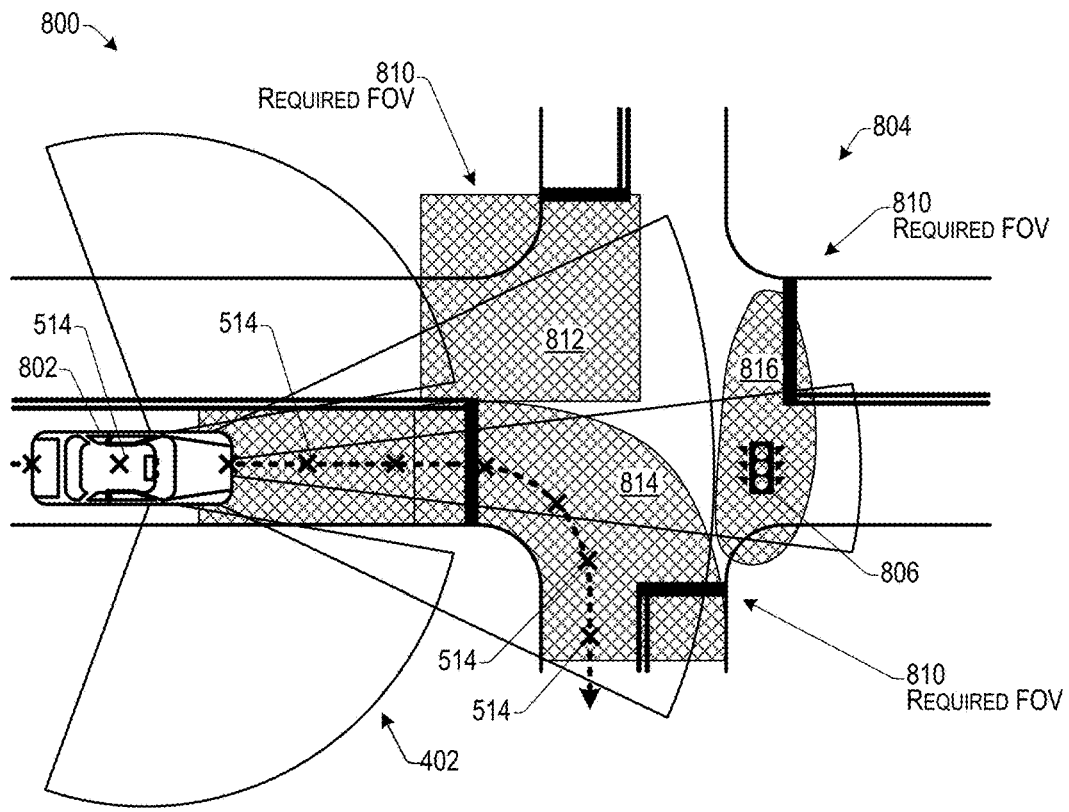
FIGS. 8A-8B and 9A-9B illustrate examples of comparing the vehicle sensor FOV with the required FOV during navigation of a right turn at an intersection according to some implementations.

FIGS. 8A-8B and 9A-9B illustrate examples of comparing the vehicle sensor FOV with the required FOV during navigation of a right turn at an intersection according to some implementations. FIG. 8A illustrates an example 800 that simulates a vehicle 802 approaching an intersection 804 having a traffic light 806. In this example, the vehicle sensor FOV 402 of the vehicle 802 may correspond to the vehicle sensor FOV 402 of FIG. 4 discussed above. A plurality of X's along the vehicle route represent nodes 514 at which the vehicle sensor FOV 402 may be compared to a required FOV 810 determined for the particular node 514. In this example, the required FOV 810 includes a first area 812 and a second area 814, similar to the example of FIG. 7A discussed above. In addition, because there is the traffic light 806 at this intersection 804, the required FOV 810 includes an area 816 for checking the status of the traffic light before proceeding to make the right turn.

The data analytics platform 145 may simulate the coverage of the vehicle sensor FOV 402 and compare the coverage of the vehicle sensor FOV 402 to the required FOV 810 to determine a coverage percentage at each node 514 along each candidate vehicle route. Furthermore, while the coverage is illustrated here in a 2D scenario, in other examples herein the coverage percentage may be determined in three dimensions including a height of vehicle sensor FOV coverage of the onboard sensors on the vehicle 802 in addition to the 2D areas illustrated in this example. The FOV overlap percentage may be evaluated at each node 514 for all road segments of the candidate routes for determining an FOV coverage for each candidate route (e.g., the candidate routes 510 and 512 as discussed above with respect to FIG. 5.

Figure 8B:
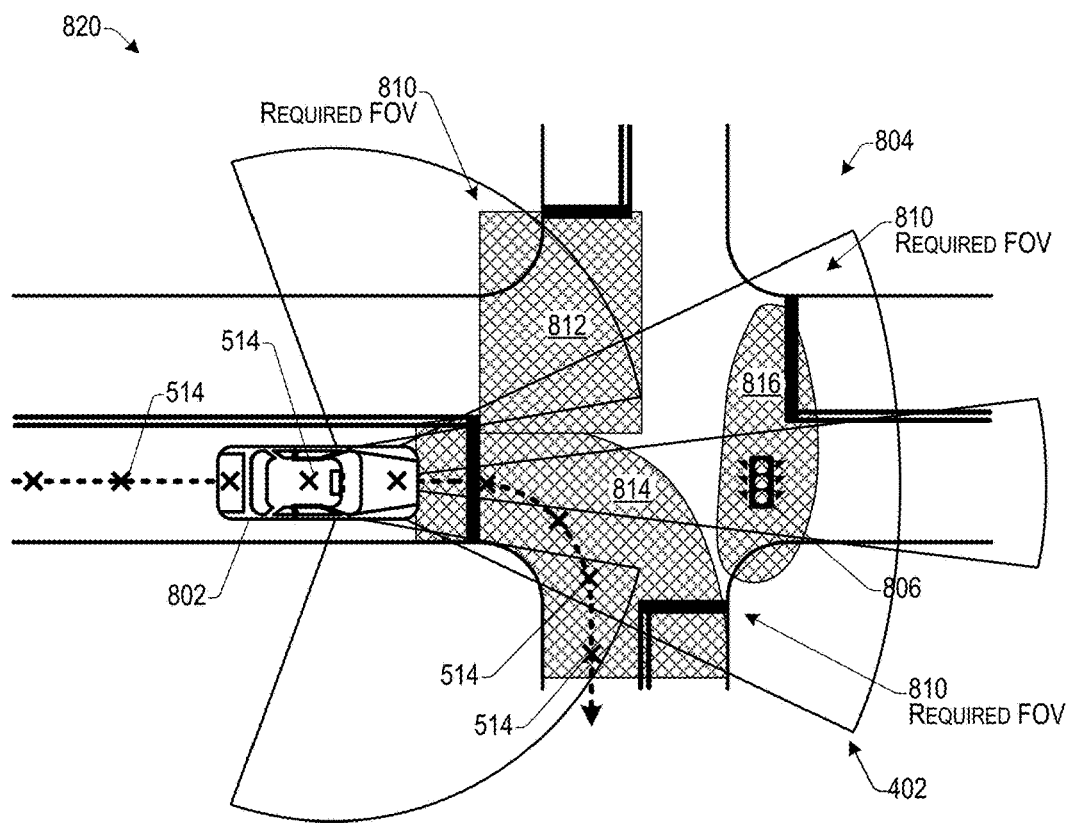

FIG. 8B illustrates an example 820 of the vehicle 802 at the intersection 804 and preparing to make the right turn as discussed above with respect to FIG. 8A. In this example, the required FOV 810 is essentially the same as in FIG. 8A. The coverage of the vehicle sensor FOV 402 may be compared to the required FOV 810 to determine, for the particular node 514 at which the vehicle 802 is located, the percentage of coverage.

Figure 9A:
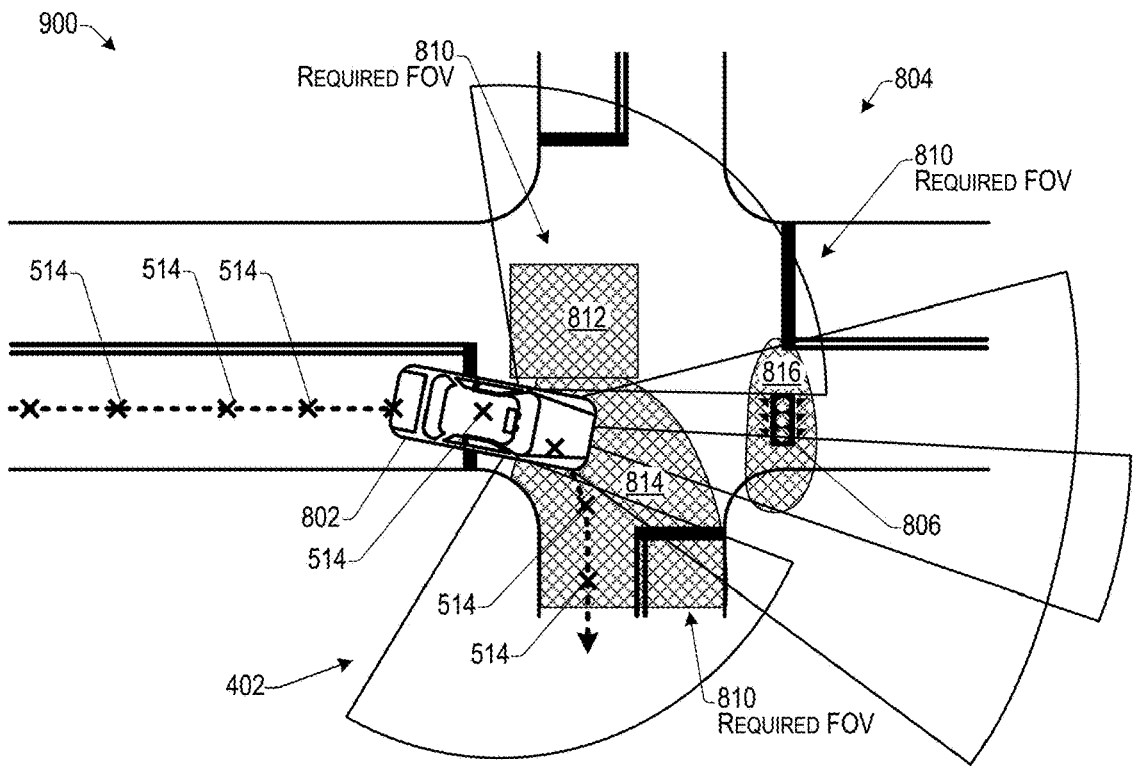

FIG. 9A illustrates an example 900 of the vehicle 802 at the intersection 804 and making the right turn as discussed above with respect to FIGS. 8A and 8B. In this example, the required FOV 810 has changed somewhat, with the areas 812 and 816 being reduced in size as compared with FIGS. 8A and 8B. The coverage of the vehicle sensor FOV 402 may be compared to the required FOV 810 to determine, for the particular node 514 at which the vehicle 802 is located, the percentage of coverage.

Figure 9B:
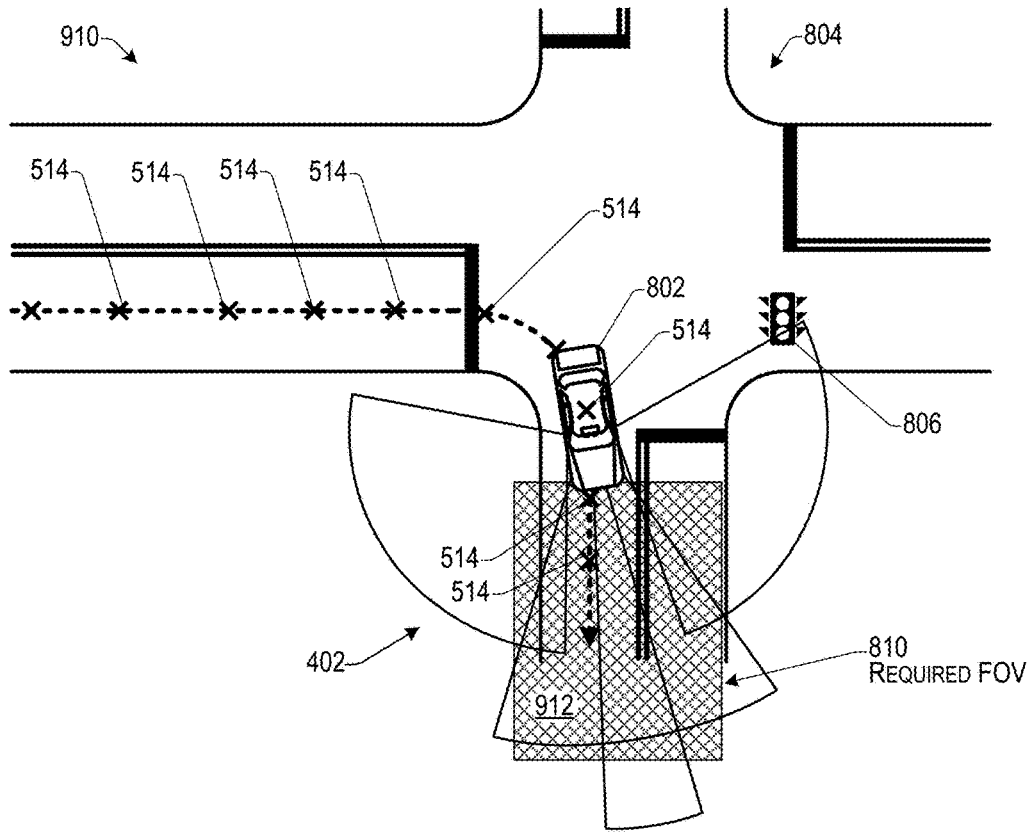

FIG. 9B illustrates an example 910 of the vehicle 802 at the intersection 804 and completing the right turn discussed above with respect to FIGS. 8A, 8B and 9A. In this example, the required FOV 810 has change entirely from that of FIGS. 8A, 8B and 9A, with the areas 812, 814 and 816 being removed or transformed into a new area 912 as the updated required FOV 810. The coverage of the vehicle sensor FOV 402 may be compared to the required FOV 810 to determine, for the particular node 514 at which the vehicle 802 is located, the percentage of coverage. The coverage comparison of the vehicle sensor FOV 402 with the required FOV at each node 514 may be performed for each node 514 along each candidate route between a source location and a destination location for determining a highest ranked route that provides the best coverage of the vehicle sensor FOV 402 with respect to the required FOV for the entire route.

FIG. 10 illustrates an example data structure 1000 of a sequence of events for performing a left turn according to some implementations. The data structure 1000 includes information including nodes 1002, sequence of events for left turn 1004, required FOV 1006, and identification (ID) of obstacles and/or landmarks 1008. Details of each sequence of events for each node 1002 are discussed below with respect to FIG. 11.

Figure 11:
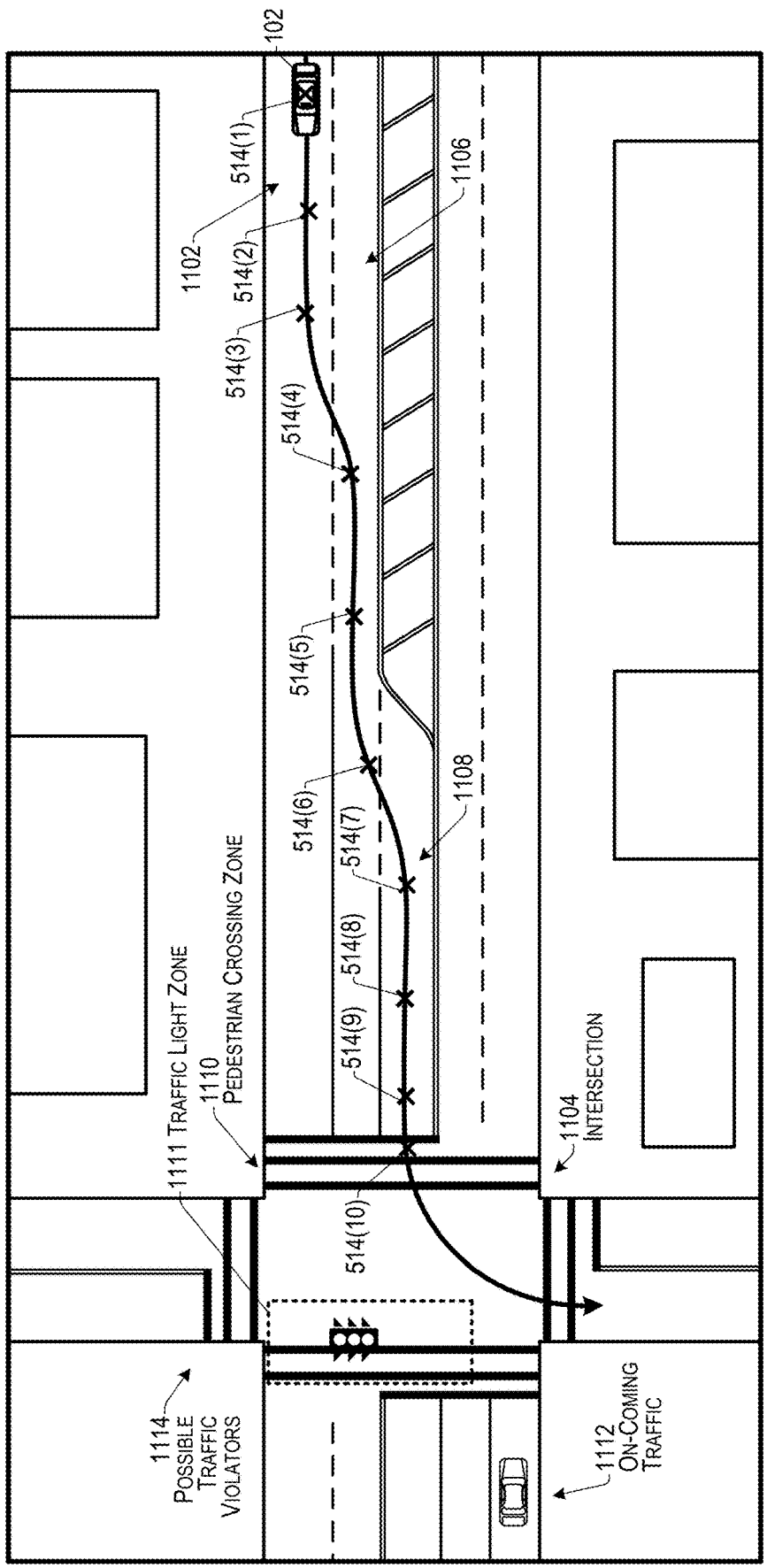
FIG. 11 illustrates an example of a sequence of events and required field of view for making a left-hand turn from a turning lane turn according to some implementations.

FIG. 11 illustrates an example of a sequence of events and required field of view for making a left-hand turn from a turning lane turn according to some implementations. The sequence of events and nodes 514(1)-514(10) in this example correspond to the data structure 1000 discussed above with respect to FIG. 10. For instance, this example describes the sequence of events that may be performed by the vehicle 102 at each node 514(1)-514(10) when traveling on a selected route and the required FOV for identifying relevant landmarks or obstacles at each node 514(1)-514(10) for safe navigation of the vehicle 102 along the selected route.

At node 514(1), the vehicle 102 may be cruising in the right lane 1102 and the required FOV may be the front, rear, and sides of the vehicle 102 for detecting potential obstacles and lane markers. At node 514(2) the vehicle 102 may check the distance to the intersection 1104. The required FOV in this situation may be map based for determining the distance and the vehicle may attempt to identify a traffic pole or other landmark that indicates the location of the intersection 1104. At node 514(3), the vehicle 102 may check the left lane 1106 prior to making a lane change. The required FOV may include the front, rear, and left side of the vehicle 102 to check for obstacles and lane markers. At node 514(4), the vehicle 102 may change to the left lane 1106 while avoiding any cars or other obstacles in the left lane 1106. The required FOV may continue to include the front, rear, and left side of the vehicle 102 to check for obstacles and lane markers. At 514(5), the vehicle 102 may check the left-turn lane 1108 before entering the left-turn lane 1108. The required FOV may continue to include the front, rear, and left side of the vehicle 102 to check for obstacles and lane markers. At 514(6), the vehicle 102 may change to the left turn lane 1108 while avoiding any cars or other obstacles in the left turn lane 1108. At 514(7), the vehicle may check the distance to the traffic light and pedestrian crossing zone 1110. The required FOV may be map based checking for obstacles, lane markers and the pedestrian crossing zone 1110. At 514(8), the vehicle 102 may check for pedestrians in the pedestrian crossing zone 1110. The required FOV may include a front wide angle to checking for pedestrians, obstacles, lane markers and the pedestrian crossing zone 1110. At 514(9), the vehicle 102 may check the state of a traffic light in a traffic light zone 1111. The required FOV may include the front of the vehicle 102 to check the traffic light state and a traffic pole landmark. At 514(10), the vehicle 102 may check for oncoming traffic 1112 and possible traffic violators 1114. The required FOV may include the front of the vehicle 102 and the right and left of the vehicle 102 to check for cars, other obstacles, and lane markers.

FIGS. 12-19 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

Figure 12:
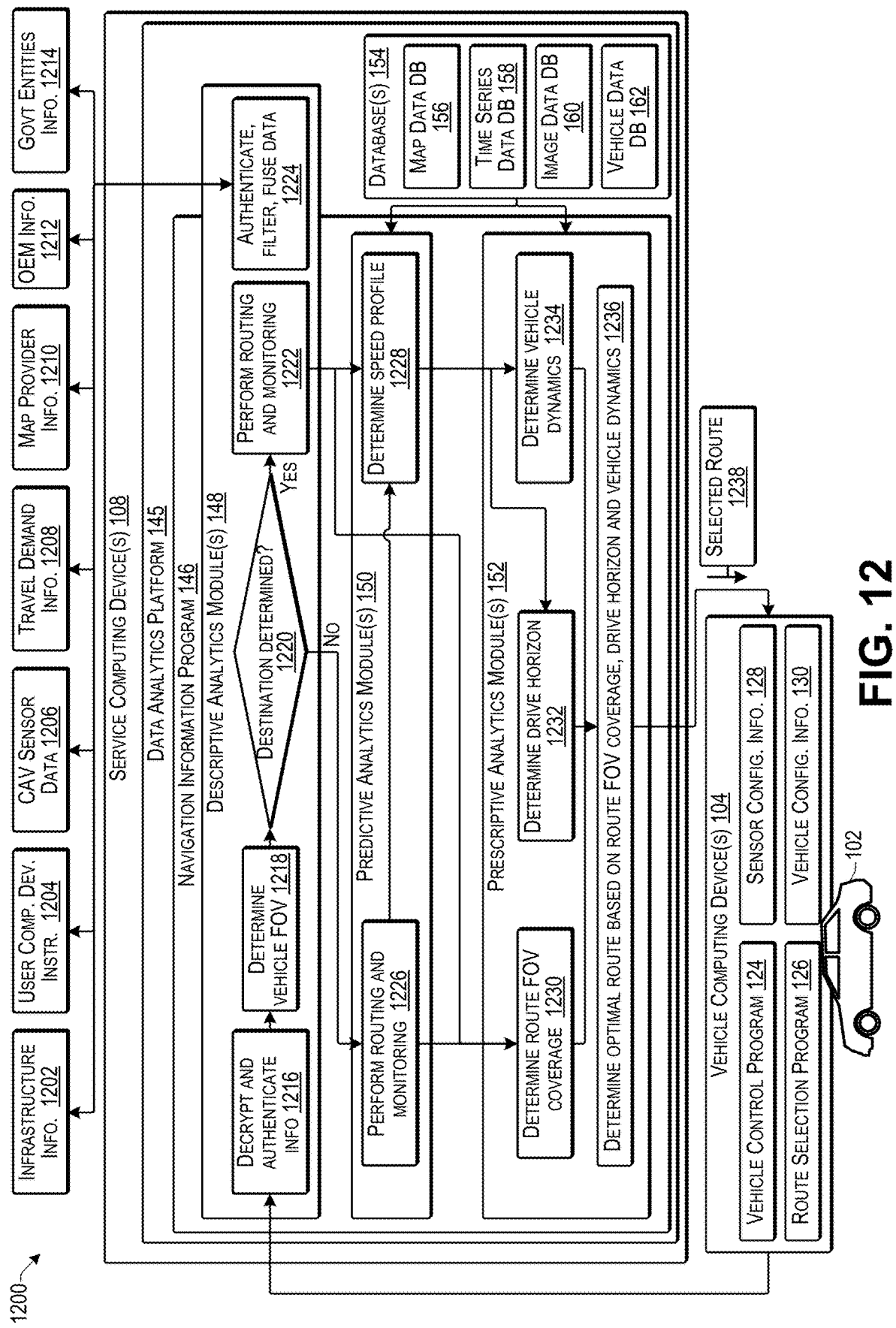
FIG. 12 is a combined flow diagram and block diagram illustrating an example architecture and process for selecting an optimal route for a vehicle according to some implementations.

FIG. 12 is a combined flow diagram and block diagram illustrating an example architecture and process 1200 for selecting an optimal route for a vehicle according to some implementations. For instance, the example of FIG. 12 includes a detailed system architecture and data flow that may be used to identify a safe and efficient route for a connected vehicle by taking into consideration the vehicle's onboard sensor configuration, vehicle powertrain, and other vehicle configuration information. In some cases, the architecture of FIG. 12 may correspond to the system 100 discussed above with respect to FIG. 1 Accordingly, the example of FIG. 12 employs the data analytics platform 145 discussed above with respect to FIG. 1. In some examples, a portion of the process described may be executed by the vehicle computing device(s) 104, and another portion of the process may be executed by the service computing device(s) 108. Furthermore, while in this example, certain functions are being illustrated as being performed by one or the other of the computing devices 104 or 108, respectively, it will be readily apparent to those of skill in the art having the benefit of the disclosure herein that some of the functions may be performed by either of the computing devices 104 or 108.

The service computing device(s) 108 hosting the data analytics platform 145 may receive various types of information from various different sources and also may provide data to one or more of the sources. Examples include infrastructure information 1202, user computing device instructions 1204, CAV sensor data 1206, travel demand information 1208, map provider information 1210, OEM information 1212, and government entity information 1214. As mentioned above, the infrastructure information 1202 may include infrastructure camera images, and other information about infrastructure, road conditions, construction projects, and the like. Furthermore, the user computing device instructions 1204 may include user preferences, user information, vehicle information, and the like received through a user computing device such as through a website or web app interface. Furthermore, the CAV sensor data 1206 may include data received directly from vehicle sensors, such as connected sensors that automatically transmit data from the vehicle 102 to the service computing device 108. The travel demand information 1208 may provide an indication of possible road crowding based on current and expected demand, which may be based in part on scheduled holidays, air travel and rail travel ticket sales, sporting events and other type of event sales, and so forth. The map provider information 1210 may include high definition and low definition maps as well as other information such as traffic data and the like. The OEM information 1212 may provide various information about vehicles produced by particular OEMs such as powertrain information, fuel efficiency, and so forth. The government entity information 1214 may indicate government provided safety information, traffic sign information, road construction information, road closure information, and so forth. In some examples, one or more data exchange application programing interfaces (APIs) may be employed for exchanging data with the above-discussed entities, such as for receiving data from the above-discussed entities or sending data to the above-discussed entities. Further, the above-discussed entities are only examples of entities with which information may be exchanged, or from which information may be received, and numerous other information entities will be apparent to those of skill in the art having the benefit of the disclosure herein.

Furthermore, the vehicle 102 may send, to the service computing device 108, encrypted information about onboard sensor configuration information 128, as well as vehicle configuration information 130, such as ECU information, powertrain and chassis specification, and so forth. In some examples, the vehicle 102 may send this information to the service computing device 108 using a broadcasting protocol such as MQTT, UDP, or the like. Additionally, in some cases, the vehicle 102 may send source location information and destination location information to the service computing device 108.

At 1216, in the data analytics platform 145, the descriptive analytics module(s) 148 may decrypt the received vehicle data such as by using cryptographic hash algorithms such as MD5, SHA-1, SHA256, or other decryption techniques. Following decryption, the descriptive analytics module(s) 148 may authenticate or otherwise determine the identity of the vehicle and an occupant, and may access the vehicle data database 162 to retrieve any information about the vehicle or occupant maintained therein. Examples of information that may be retrieved may include the vehicle sensor configuration information 128 and/or vehicle configuration information 130 that may have been previously received for the vehicle, as well as user preferences, routing preferences, etc., for an owner of the vehicle or other occupant of the vehicle.

At 1218, the descriptive analytics module 148 may determine the vehicle FOV from the vehicle sensor configuration information 128. In some examples, the sensor configuration information 128 may be received from the vehicle 102, while in other examples, the sensor configuration information 128 may be received from the vehicle data database 162. For example, the sensor configuration information 128 may be unlikely to change substantially over time and therefore, having been received previously and stored in the vehicle data database 162 does not need to be transmitted by the vehicle 102 every time a route is to be determined.

At 1220, the descriptive analytics module(s) 148 may determine whether a destination location is specified in the received and decrypted vehicle data. If the vehicle destination is available in the decrypted vehicle data, the process goes to 122 to perform routing and monitoring. On the other hand, if the vehicle destination is not included in the received information, the process goes to 1226 to perform the routing and monitoring with prediction of the destination location.

At 1222, descriptive analytics module(s) 148 may execute a routing and monitoring algorithm that accepts inputs of vehicle source location, destination location, map, traffic and weather data and determines candidate routes for the vehicle to reach the destination location. The routing and monitoring algorithm may be executed by both the descriptive analytics module(s) 148 and the predictive analytics module(s) 150, which may be alternatively invoked based on whether the destination location has been provided with the vehicle information or needs to be predicted. If the destination location is not available to the descriptive analytics module(s) 148, the routing and monitoring algorithm may be is invoked by the predictive analytics module(s) 148 following use an AI-based model to predict the destination location, such as by considering the vehicle occupant's history, time of the day, vehicle location, and the like. After the destination location is predicted, and, optionally, confirmed by the vehicle occupant, the routing and monitoring algorithm may be executed to generate candidate routes to the predicted destination as additionally below with respect to 1226.

At 1224, the descriptive analytics module(s) 148 may further receive the data from the various external sources 1202-1214, and may perform authentication, filtering, and/or fusing of the received data. For example, the data analytics platform 145 may use data filtering and data fusion to ingest various types of timeseries and image data obtained from traffic infrastructure, user smartphones, third parties, and so forth. The data may be ingested and stored in the databases 154 or the like. As several nonlimiting examples, the data may be managed using a combination of SQL (Structured Query Language) and non-SQL databases for achieving superior real-time performance of the data analytics platform 145.

At 1226, in the case that the destination location is not included in the received information received from the vehicle 102, the predictive analytics module(s) 150 may predict the destination location, such as by using a model-learning model, rule-based model, or the like, and based on a vehicle occupant profile, historic trip data, time-of-day, and/or other information stored in the vehicle data database 162. The predicted destination may be sent by the service computing device 108 to a voice assistant or other human machine interface at the vehicle computing device 104. As one example, an interactive voice request may be sent to the vehicle occupant for obtaining confirmation of the predicted destination. The predictive analytics modules 150 may receive a confirmation of the predicted destination location or an input that indicates an alternative destination location. Following determination of the destination location, the predictive analytics module(s) 150 may perform routing and monitoring to determine candidate routes between the source location and the destination location. An example of determining candidate routes is discussed above, e.g., with respect to FIG. 5.

At 1228, the service computing device may determine a speed profile for each of the candidate routes. The speed profile algorithm may predict vehicle speed for each candidate route and may therefore be performed by the predictive analytics module(s) 150. The speed profile algorithm may receive the most updated vehicle routes from the routing and monitoring algorithm in the predictive or descriptive analytics layers. For every road segment of the route, the vehicle speed may be predicted using a speed prediction model, which may include one or more of machine-learning models, statistical models or rule-based model. Additional inputs to the speed prediction model may include real-time traffic and trip history of the current road segment. The real-time traffic speed may be obtained from a third party data provider, such as the map data provider or the like. The speed profile for the candidate route may be obtained by storing the predicted speed for each road segment in the respective candidate route. Further, this process may be executed for all of the candidate routes. An example algorithm for determining the speed profile is discussed additionally below with respect to FIG. 14.

After the destination is determined either by prediction or as specified by the vehicle occupant, and after the candidate routes are determined between the source location and the destination location, the candidate routes may be sent to the prescriptive analytics module(s) 152. The prescriptive analytics module(s) 152 may execute several different algorithms for determining route FOV coverage (corresponding to safety of the route), drive horizon (corresponding to vehicle efficiency), and vehicle dynamics (corresponding to occupant comfort), and then the output from these algorithms may be used to determine an optimal route.

At 1230, for determining route FOV coverage for each candidate route, the prescriptive analytics module(s) 152 receives as inputs, the required FOV for the candidate routes from the map data database 156. As discussed above with respect to, e.g., FIGS. 5-11, the required FOV may include, for each node along a candidate route, the zone (2D or 3D) that should be monitored by a human driver or the vehicle sensors. As mentioned above, the required FOV for each road segment in a geographic region may be determined and stored in advance in the map data database 156. As one example, the map data database 156 may be a relational SQL database, or any other suitable type of data structure. The map data database 156 may also host other types of map data such as high definition maps, road profiles, landmark information, and the like, that may be employed by automated vehicles. Thus, using the information maintained in the map data database 156 and based on the vehicle FOV determined from the vehicle sensor configuration information 128, the service computing device 108 may execute the route FOV coverage algorithm to determine a percentage of FOV coverage based on comparing the required FOV and the vehicle FOV for each candidate route. An example of this process is discussed above e.g. with respect to FIGS. 8A-9B, and an example of the algorithm is further discussed below, e.g., with respect to FIGS. 15 and 16. For instance, the route FOV coverage algorithm determines the required FOV for each road segment at a corresponding node, and determines how much of the required FOV may be covered by the vehicle's onboard sensors based on the calculated vehicle sensor FOV for the particular vehicle. The percentage of FOV coverage may be determined by using 2D or 3D grid-based geometric intersection between required FOV and vehicle sensor FOV at each road segment (i.e., the road segment between a first node at which the vehicle is located and a second node to which the vehicle will travel) along the route, e.g., as discussed above with respect to FIGS. 8A-9B. The route FOV coverage algorithm may aggregate or otherwise determine the total percentage of all road segments of the entire route for each candidate route and selects one or more of the highest ranked having the highest percentage of required FOV coverage by the vehicle sensors. Accordingly, the FOV coverage algorithm may output the routes that have the highest overall percentage of FOV coverage.

At 1232, the prescriptive analytics module(s) 152 may determine a drive horizon based on the candidate routes. For example, based on the vehicle powertrain specification, the drive horizon algorithm may employ fast running data driven and physics-based powertrain simulation models to calculate energy usage of the particular vehicle over the candidate routes. As one example, a powertrain model may receive, as inputs, road profile, predicted speed profile, weather, etc., and may simulates the fuel consumption performance of the vehicle powertrain model on each candidate route. The drive horizon algorithm may output the routes having the highest fuel/power consumption efficiency. An example of the drive horizon algorithm is set forth below with respect to FIG. 17.

At 1234, the prescriptive analytics module(s) 152 may execute a vehicle dynamics algorithm that simulates vehicle dynamics performance for the particular vehicle, such as for determining, e.g., vehicle jerk, roll, pitch, yaw, crash safety, autonomous driving duration, and the like. The vehicle dynamics algorithm may receive, as inputs, the speed profile, the speed limit, road geometry, road curvature, and the like, for each candidate route. The vehicle dynamics algorithm may output the highest ranked routes that have a low crash probability, and that avoid excessive vehicle jerk, roll, pitch, yaw etc. An example of the vehicle dynamics algorithm is discussed below with respect to FIG. 18.

At 1236, the prescriptive analytics module(s) 152 may execute an optimization algorithm that receives the outputs from the FOV coverage algorithm, the drive horizon algorithm, and the vehicle dynamics algorithm for determining an optimal route for the vehicle from the source location to the destination location. In some examples, the optimization algorithm may employ both machine learning and rule-based optimization techniques to output the best route for partially/fully autonomous vehicles considering safety, efficiency, comfort, trip travel time and autonomous driving duration. In some examples, the results of the optimization algorithm may be updated periodically, such as at predefined intervals, or the occurrence of an event, such as based on live traffic update or changes to other external conditions, such as weather, road closures, or the like. An example of the optimization algorithm is discussed additionally below with respect to FIG. 19.

At 1238, the service computing device 108 may send a selected optimal route to the vehicle computing device 104. The vehicle computing device 104 may provide the selected route to the vehicle control program 124 for use in navigating to the destination location.

Figure 13:
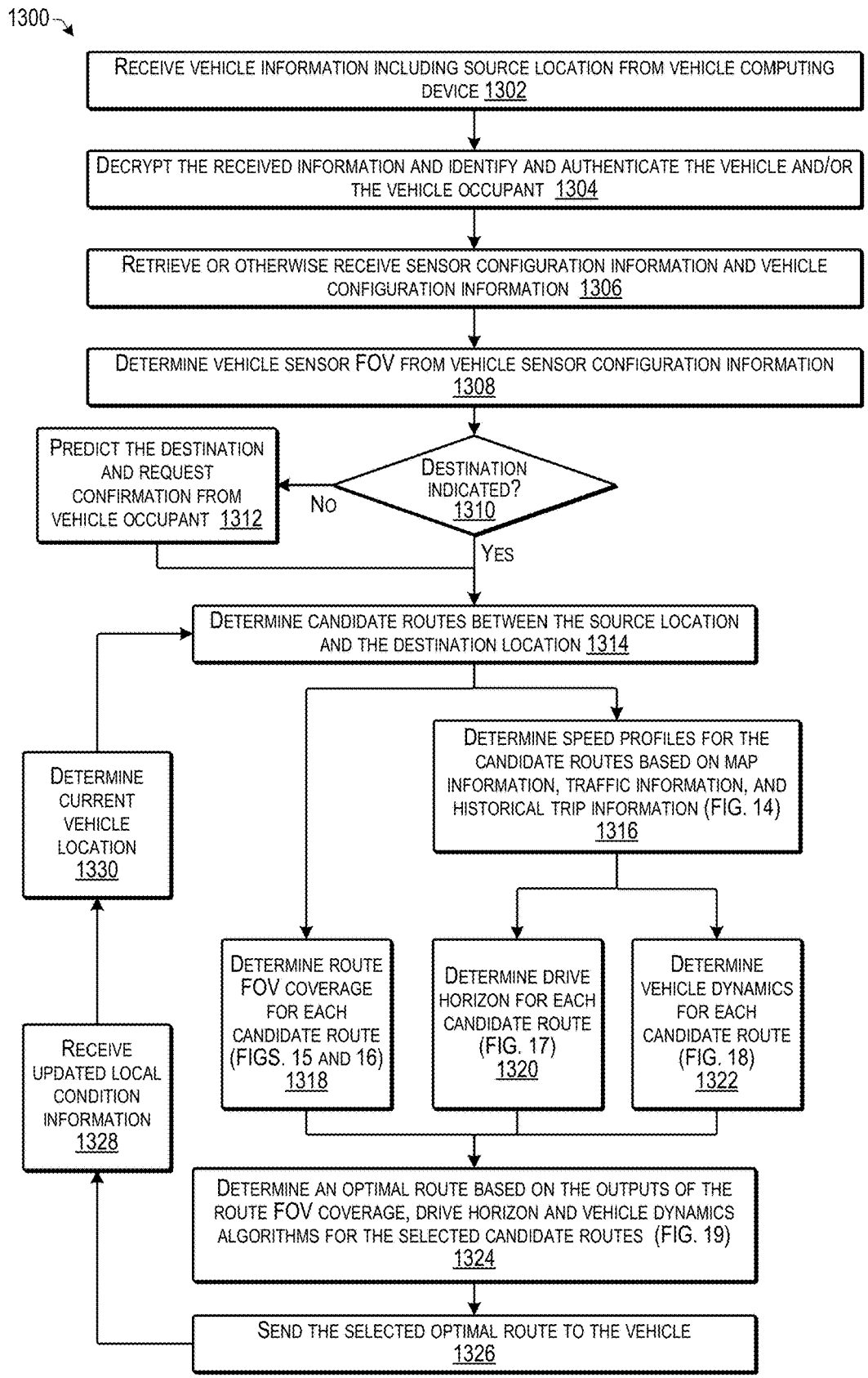
FIG. 13 is a flow diagram illustrating an example process for determining an optimal route for a vehicle according to some implementations.

FIG. 13 is a flow diagram illustrating an example process 1300 for determining an optimal route for a vehicle according to some implementations. In some examples, the process 1300 may be executed by the system 100 discussed above. For example, the process 1300 may be executed by the service computing device(s) 108 by executing the navigation information program 146 in some examples.

At 1302, the service computing device 108 may receive vehicle information including source location from vehicle computing device. For example, vehicle information received by the service computing device 108 may include source location, destination location, sensor configuration (ADAS/AD and other sensors details) and vehicle configuration information, e.g., pertaining to electronic control unit, powertrain, chassis, vehicle occupant profile, etc., may be sent from the vehicle to the service computing device 108. The service computing device 108 may further receive third party data, e.g., as discussed above with respect to FIG. 12. For example, data from external data streams such as infrastructure camera, connected and automated vehicles, third party data providers, and the like, may be authenticated before sending to data filtering and data fusion algorithms. The outputs of the data filtering and data fusion algorithms may include trip history, weather, traffic, V2X data, high definition (HD) maps, and the like.

At 1304, the service computing device 108 may decrypt the received information and identify and authenticate the vehicle and/or occupant. As one example, the service computing device may first perform authentication to verify the connected vehicle and/or vehicle occupant. After authentication is successful the other information obtained from vehicle may be checked, such as source location, destination location, whether vehicle configuration information and sensor information was received, and so forth.

At 1306, the service computing device 108 may retrieve or otherwise receive sensor configuration information and vehicle configuration information. For example, if vehicle configuration information and sensor configuration information is received, this information may be stored in the vehicle data database 162 and used for route determination. On the other hand, the information may have been received previously, and may be retrieved from the vehicle data database 162 following authentication of the vehicle. A vehicle occupant profile including routing preferences of the vehicle occupant may be similarly received and stored in the vehicle data database 162.

At 1308, the service computing device 108 may determine vehicle sensor FOV from vehicle sensor configuration information. As discussed above, e.g., with respect to FIGS. 2-4, the service computing device may determine a vehicle sensor FOV based on the description of the sensor configuration for the vehicle.

At 1310, the service computing device 108 may determine whether the destination is indicated. If the destination location is included in the received information, the process may go to 1314. If not, the process goes to 1312.

At 1312, the service computing device 108 may predict the destination and request confirmation from the vehicle occupant. For example, when the destination location is not specified in the vehicle information received from the vehicle (e.g., destination is not been defined by the vehicle occupant (user)), then the service computing device 108 may check the vehicle data database to determine whether the vehicle occupant's profile is available. If the vehicle occupant's profile is located, then the routing and monitoring algorithm (executed in predictive layer) may predict the destination location for the vehicle occupant, such as by using an AI-based model or other suitable algorithm. The predicted destination may be sent as an interactive voice request to the vehicle for presentation to the vehicle occupant for confirmation of predicted destination. Alternatively, in other examples, the predicted destination may be presented to the vehicle occupant as text on a display, as a location on a map, or the like. If the vehicle occupant confirms the predicted destination, the confirmed destination may be sent back to the routing and monitoring algorithm in predictive analytics layer.

At 1314, the service computing device 108 may determine candidate routes between the source location and the destination location. If the destination location is defined in the information received from the vehicle, then the destination location is passed to the routing and monitoring algorithm executed in the descriptive analytics layer. This routing and monitoring algorithm generates candidate routes which are passed to the prescriptive analytics layer. This routing and monitoring algorithm gets input of real-time traffic and confirmed destination inputs for determining candidate routes from the source location to the destination location. The real-time traffic information may be updated such as periodically using time loop that executes at fixed time intervals or through any of various other update techniques. The service computing device 108 may obtain the traffic data from a third party webserver, or the like. The traffic information may be ingested in the database and sent to the routing and monitoring algorithm periodically, as discussed additionally below with respect to 1328.

Figure 14:
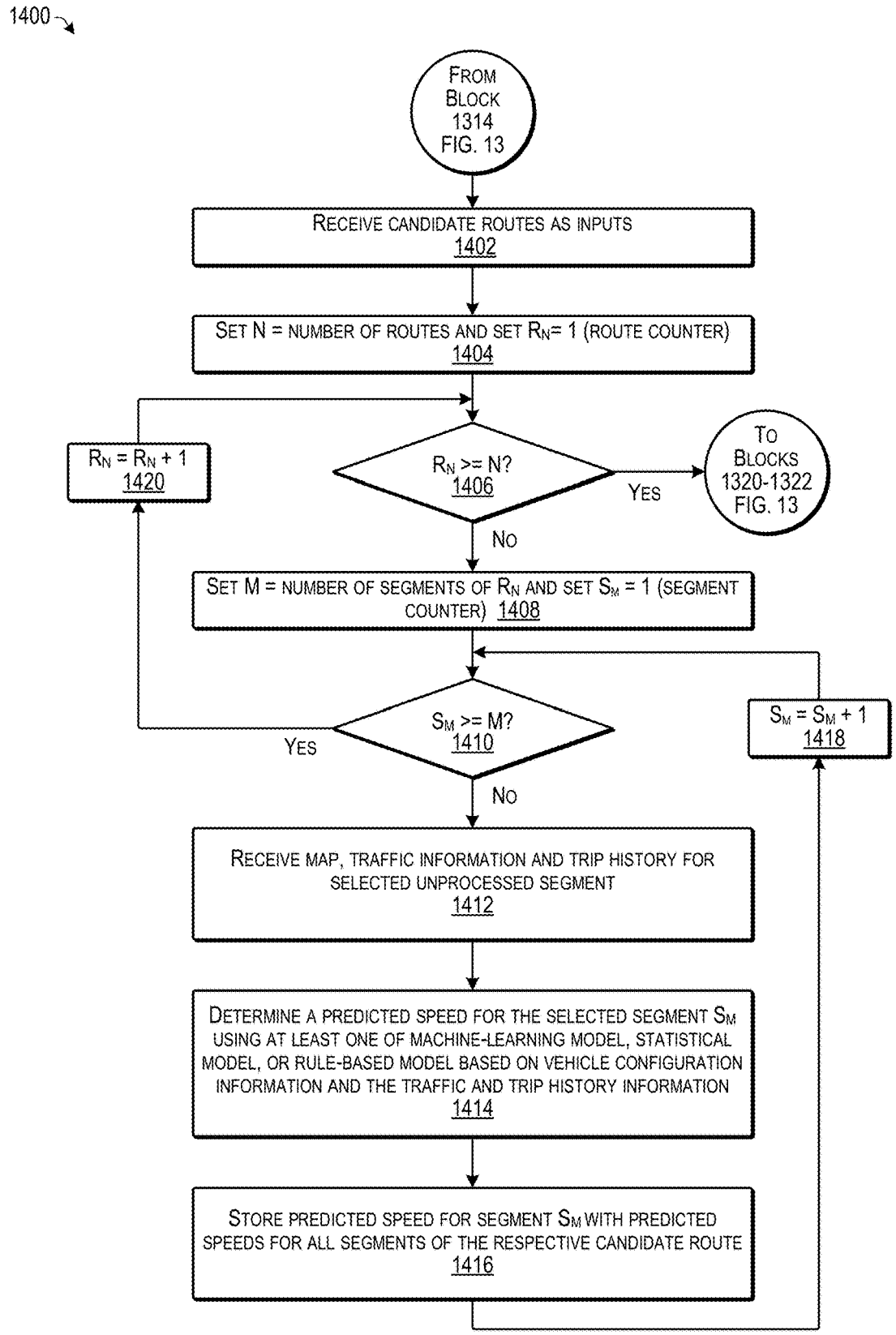
FIG. 14 is a flow diagram illustrating an example speed profile algorithm as a process for determining predicted speed along a candidate route according to some implementations.

At 1316, the service computing device 108 may determine speed profiles for the candidate routes based on map information, traffic information, and historical trip information. FIG. 14 describes additional details of the speed profile algorithm. The candidate routes determined from execution of the routing and monitoring algorithm in either the predictive analytics layer or descriptive analytics layer are sent to the speed profile algorithm. The speed profile algorithm uses the received routes along with real-time traffic, trip history and standard definition (SD) map inputs from the data analytics platform databases 154. The speed profile algorithm outputs a predicted vehicle speed for each candidate route.

Figure 15:
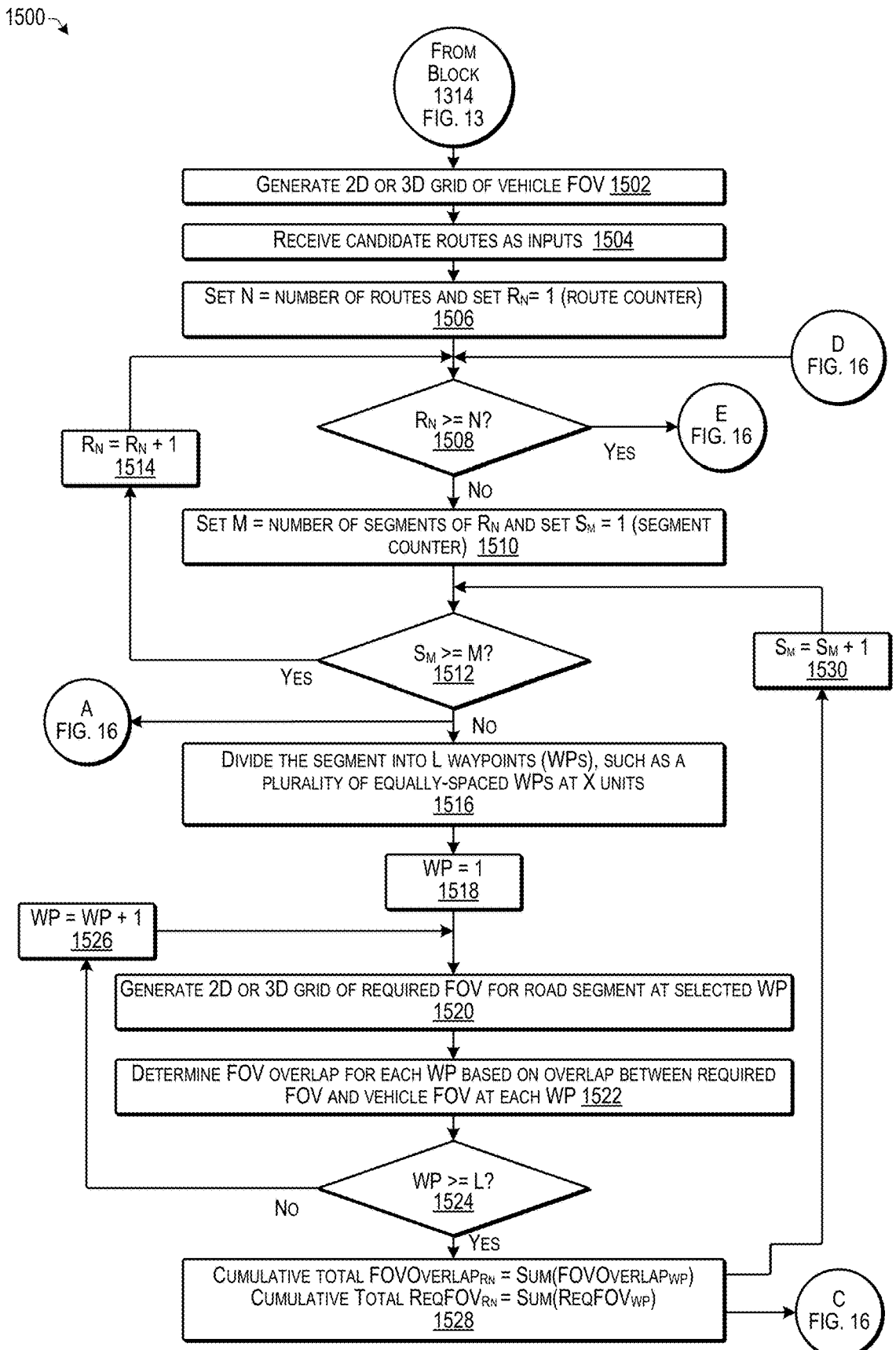
FIGS. 15 and 16 provide a flow diagram illustrating an example of the route FOV coverage algorithm as a process for determining FOV coverage of the required FOV for candidate routes according to some implementations.

At 1318, the service computing device 108 may determine route FOV coverage for each candidate route. FIG. 15 describes additional details of the route FOV coverage algorithm. The required FOV for roads in a geographic region may be determined in advance and stored in the map data database 156. The prescriptive, predictive and descriptive analytics layers may share information with each other. For example, the predictive layer or descriptive layer may send candidate routes determined by the routing and monitoring algorithm to the route FOV coverage algorithm, the drive horizon algorithm, and the vehicle dynamics algorithm in the prescriptive layer. The route FOV coverage algorithm may receive the candidate routes as well as the vehicle FOV determined by the descriptive layer and the required FOV for candidate routes obtained from the map data database 156. The route FOV coverage algorithm may output a plurality of routes with the highest percentage of FOV coverage, and may send these highest ranked routes to the optimization algorithm, corresponding to the safest routes based on sensor coverage.

Figure 17:
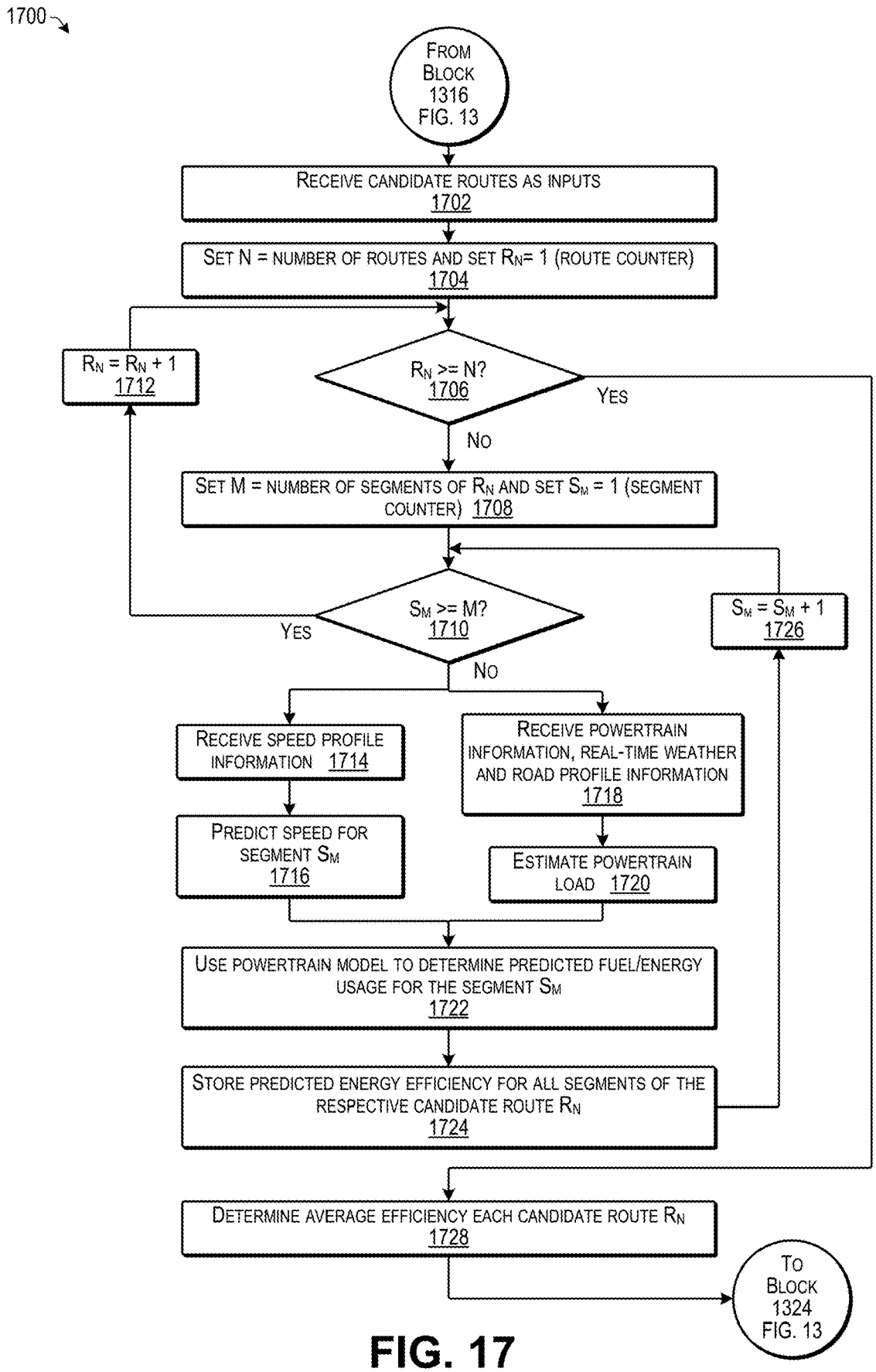
FIG. 17 is a flow diagram illustrating an example drive horizon algorithm as a process for determining route efficiency according to some implementations.

At 1320, the service computing device 108 may determine the drive horizon for each candidate route. FIG. 17 describes additional details of the drive horizon algorithm. The drive horizon algorithm receives inputs of candidate routes, predicted speed profiles for the candidate routes from the speed profile algorithm, road profiles from the map data database 156, weather from the time series data database 158. The output of the drive horizon algorithm may include fuel efficiency or energy efficiency projected for each candidate route. A plurality of the highest ranked candidate routes corresponding to the highest vehicle efficiency may be sent to the optimization algorithm.

Figure 18:
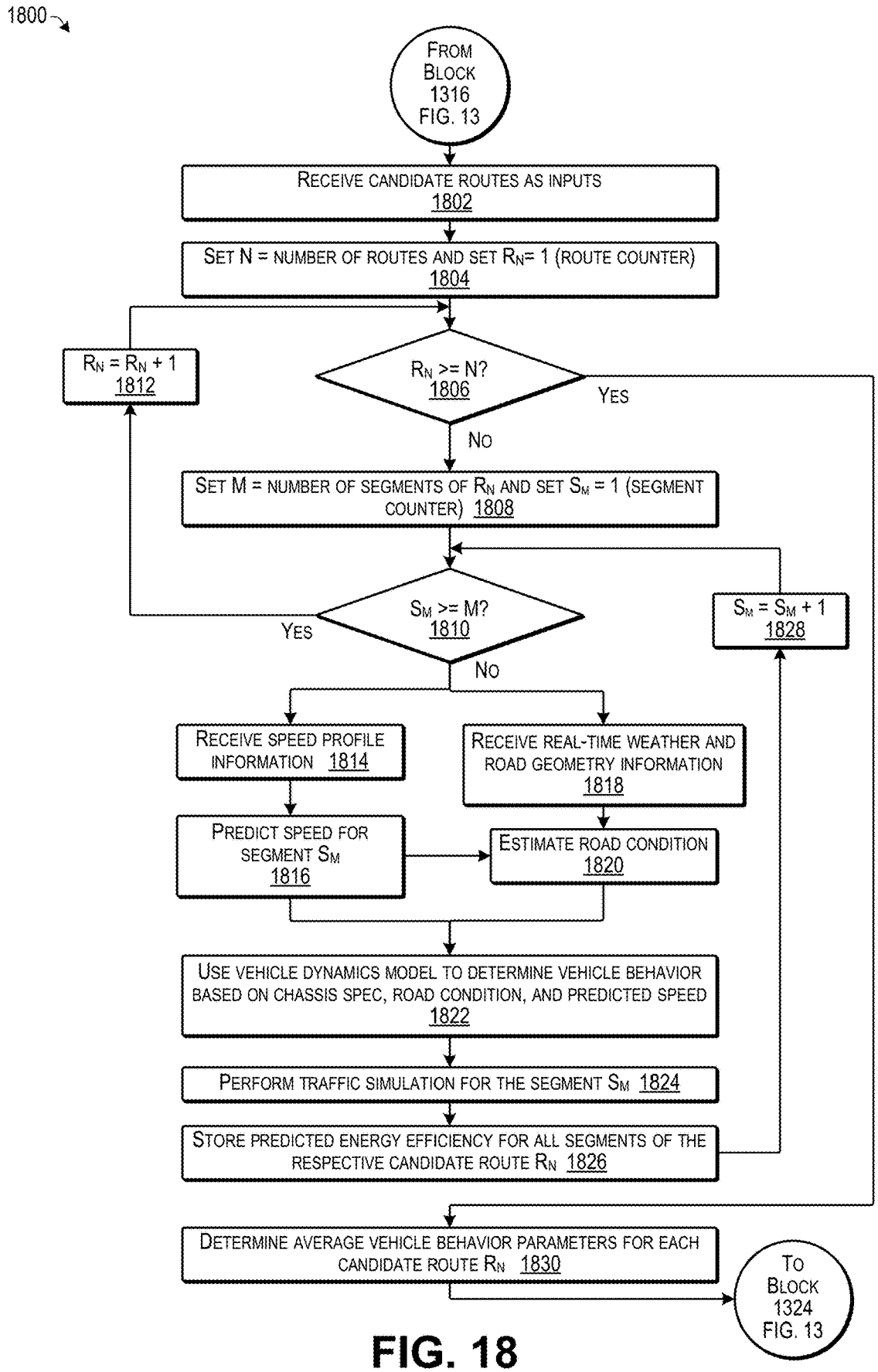
FIG. 18 is a flow diagram illustrating an example of the vehicle dynamics algorithm as a process for determining vehicle dynamics according to some implementations.

At 1322, the service computing device 108 may determine vehicle dynamics for each candidate route. FIG. 18 describes additional details of the vehicle dynamics algorithm. For example, the vehicle dynamics algorithm may receive, as inputs, the candidate routes, road geometry from the map data database 156 database and vehicle chassis specification from the vehicle data database 162 or from the received vehicle information. The output of vehicle dynamics algorithm may be a plurality of highest ranked routes that are sent to the optimization algorithm, and that are based on the predicted occupant comfort for the routes.

At 1324, the service computing device 108 may determine an optimal route based on the outputs of the route FOV coverage algorithm, drive horizon algorithm, and vehicle dynamics algorithm for the selected candidate routes selected by these three respective algorithms. FIG. 19 describes additional details of the optimal routing algorithm, which may provide, as output, a route selected as the safest, most energy efficient, and most comfortable route.

At 1326, the service computing device 108 may send the selected optimal route to the vehicle. For example, the vehicle may receive the selected optimal route, and may proceed along the selected route.

At 1328, the service computing device 108 may receive updated local condition information. The updated local condition information, such as real-time traffic information, may be received periodically, on demand, or upon the occurrence of a significant event. The updated local condition information such as traffic update, weather updates, or the like may be used to update the optimal route for the vehicle. As one example, the real-time traffic information may be updated periodically using time loop that executes at fixed time intervals or through any of various other update techniques. The service computing device 108 may obtain the updated traffic data from a third party webserver, or the like. The traffic information may be ingested in the time series data database 158 and provided to the routing and monitoring algorithm periodically.

At 1330, the service computing device 108 may determine current vehicle location. Based on the current vehicle location and the updated local condition information, the service computing device may determine an updated optimal route for the vehicle, and may send the updated optimal route to the vehicle.

FIG. 14 is a flow diagram illustrating an example speed profile algorithm 1400 as a process for determining predicted speed along a candidate route according to some implementations. In some examples, the process 1400 may be executed by the system 100 discussed above. For example, the process 1400 may be executed by the service computing device 108 executing the speed profile algorithm. In some cases, the process 1400 may correspond in part to block 1316 of the process 1300 of FIG. 13 discussed above.

At 1402, the service computing device 108 may receive candidate routes as inputs. For example, as discussed above, the speed profile algorithm may receive a plurality of candidate routes from the routing and monitoring algorithm executed in either the descriptive analytics layer or the predictive analytics layer, e.g., as discussed above with respect to block 1314 of FIG. 13.

At 1404, the service computing device 108 may initialize a first loop by setting a first variable N=number of routes, e.g., representative of the total number candidate routes, and setting a second variable $R_N$=1, e.g., as a counter representative of the candidate route currently selected for processing.

At 1406, the service computing device 108 may determine whether the value of $R_N$ is greater than or equal to the value of N. If not, the process goes to block 1408. If so, the process goes to blocks 1320 and 1322 of the FIG. 13.

At 1408, the service computing device 108 may initialize a nested second loop by setting a third variable M=number of segments of $R_N$, and setting a fourth variable $S_M$=1, e.g., as a counter representative of the segment currently selected for processing.

At 1410, the service computing device 108 may determine whether $S_M$ is greater than or equal to M. If not, the process goes to block 1412. If so, the process goes to block 1420 to increment $R_N$.

At 1412, the service computing device 108 may receive map, traffic information, and trip history for the selected segment of the selected candidate route.

At 1414, the service computing device 108 may determine a predicted speed for the selected segment $S_M$ using a speed prediction model that includes at least one of a machine-learning model, a statistical model, or a rule-based model based on vehicle configuration information and the traffic and trip history information for the selected road segment. The output of the speed prediction model may be a predicted speed profile for the selected segment of the selected candidate route.

At 1416, the service computing device 108 may store the predicted speed for the selected segment $S_M$ with the predicted speeds for all segments of the respective candidate route.

At 1418, the service computing device 108 may increment the variable SM by a value of one, and may return to block 1410. For example, the process of blocks 1410-1418 may be repeated until all segments in a selected candidate route have been processed.

At 1420, when $S_M$=M, all of the segments in the candidate route have been processed, and the service computing device 108 may increment the variable $R_N$ by a value of one. The process may then return to block 1406 to determine whether all candidate routes have been processed, i.e., $R_N$=N. When all candidate routes have been processed, the process returns to block 1318 of FIG. 13. The output of the speed profile algorithm may be passed to at least the drive horizon algorithm.

Figure 16:
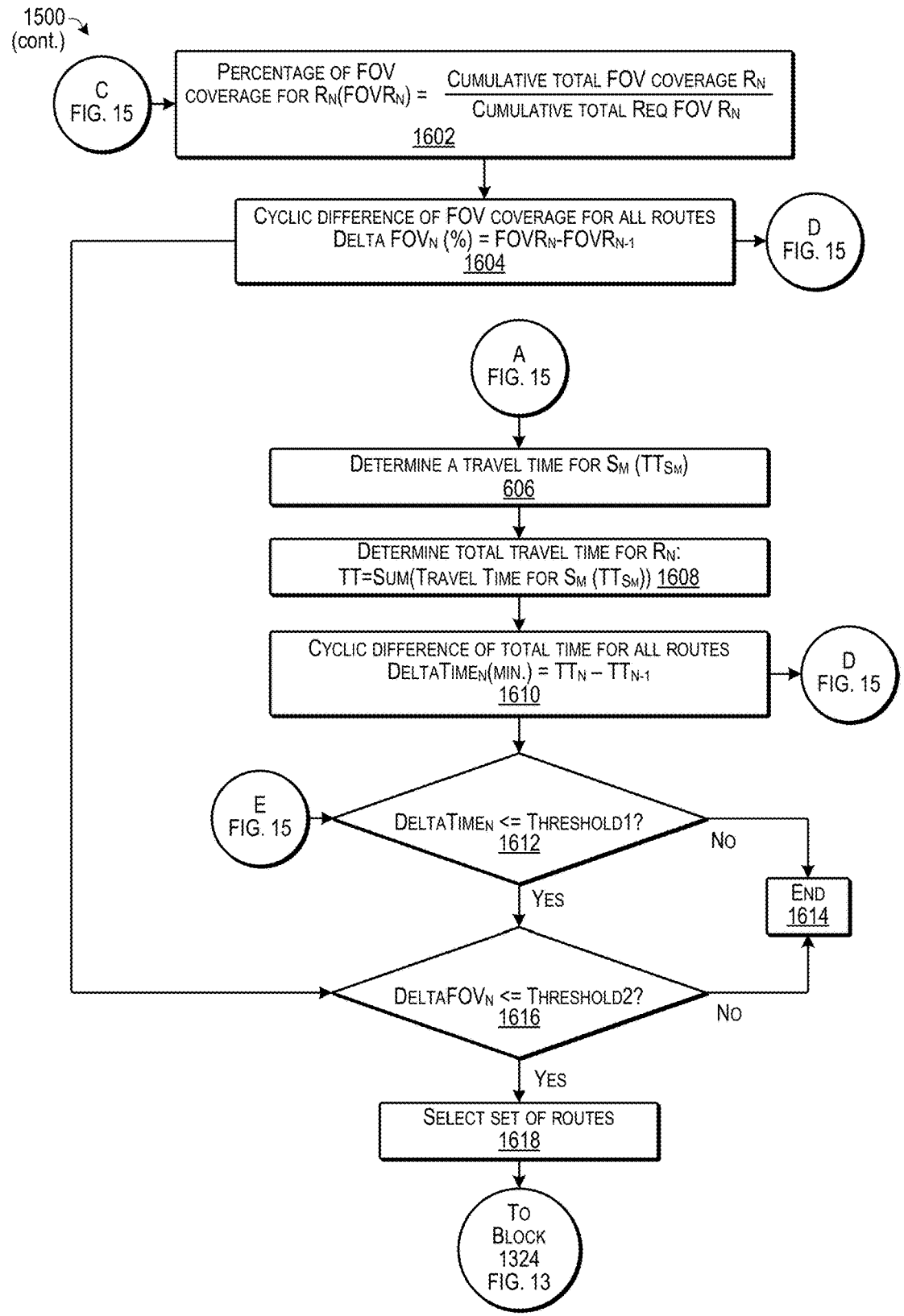

FIGS. 15 and 16 provide a flow diagram illustrating an example of the route FOV coverage algorithm 1500 as a process for determining FOV coverage of the required FOV for candidate routes according to some implementations. In some examples, the process 1500 may be executed by the system 100 discussed above. For example, the process 1500 may be executed by the service computing device 108 executing the route FOV coverage algorithm. In some cases, the process 1500 may correspond in part to block 1318 of the process 1300 of FIG. 13 discussed above.

The route FOV coverage algorithm 1500 calculates a route specific percentage of FOV coverage provided by vehicle's sensor FOV. This calculation is done by finding the overlap between vehicle sensor FOV and required FOV retrieved from the map data database 156 for every road segment of the candidate routes obtained from the routing and monitoring algorithm.

At 1502, the service computing device 108 may generate a 2D or 3D grid of the vehicle sensor FOV. Examples of the vehicle sensor FOV are discussed above, e.g., with respect to FIGS. 2-11.

At 1504, the service computing device 108 may receive candidate routes as inputs. For example, as discussed above, the speed profile algorithm may receive a plurality of candidate routes from the routing and monitoring algorithm executed in either the descriptive analytics layer or the predictive analytics layer, e.g., as discussed above with respect to block 1314 of FIG. 13.

At 1506, the service computing device 108 may initialize a first loop by setting a first variable N=number of routes, e.g., representative of the total number candidate routes, and setting a second variable $R_N$=1, e.g., as a counter representative of the candidate route currently selected for processing.

At 1508, the service computing device 108 may determine whether the value of $R_N$ is greater than or equal to the value of N. If not, the process goes to block 1508. If so, the process returns to block 1318 of the FIG. 13.

At 1510, the service computing device 108 may initialize a nested second loop by setting a third variable M=number of segments of $R_N$, and setting a fourth variable $S_M$=1, e.g., as a counter representative of the segment currently selected for processing.

At 1512, the service computing device 108 may determine whether $S_M$ is greater than or equal to M. If not, the process goes to block 1516. If so, the process goes to block 1514 to increment $R_N$.

At 1514, when $S_M$=M, all of the segments in the candidate route have been processed, and the service computing device 108 may increment the variable $R_N$ by a value of one. The process may then return to block 1508 to determine whether all candidate routes have been processed, i.e., $R_N$=N.

At 1516, the service computing device 108 may divide the segment into L waypoints (WPs), e.g., a plurality of equally-spaced WPs that are spaced apart from each other by X units. The WPs may correspond to the nodes 514 discussed above in some examples.

At 1518, the service computing device 108 may set WP=1 as a counter representing the waypoint currently being processed for initializing a third nested loop.

At 1520, the service computing device 108 may generate a 2D or 3D grid of the required FOV for the road segment at the selected WP. For example, a 2D or 3D grid may be generated for the required FOV at the selected WP (node) and may be stored in array variable such as "Required $FOV_{wp}$".

At 1522, the service computing device 108 may determine FOV overlap for each WP based on overlap between required FOV and vehicle FOV at each WP. For example, the algorithm may calculate overlap between the required FOV and vehicle sensor FOV using the 2D/3D grid geometric intersection. The overlap value at the current node WP may be stored in the array variable "FOVOverlap$_{wp}$". The "FOVOverlap" array may be incremented in the third nested loop to store the FOV overlap values at each node WP of the current road segment $S_M$.

At 1524, the service computing device 108 may determine whether WP is greater than or equal to L. If so, then all WPs have been processed and the algorithm proceeds to 1528. If not, the process goes to 1526.

At 1526, the service computing device 108 may increment WP by a value of one to process the next WP.

At 1528, the service computing device 108 may determine a cumulative total for the FOV overlap for the selected route (e.g., FOVOverlapR$_N$=Sum(FOVOverlap$_{WP}$)), and may further determine a cumulative total for the required FOV for the selected route (e.g., ReqFOV$_{RN}$=Sum(ReqFOV$_{WP}$)). The process may then go to 1530 to increment the segment counter for the selected route, and may further go to block 1602 in FIG. 16.

At 1530, the service computing device 108 increments the segment counter SM by a value of one and goes to 1512 to determine whether all segments have been processed. For example, The second and third loops are executed for all road segments, thus populating the "FOVOverlap$_{WP}$" and "Required FOV$_{WP}$" for an entire route ($R_N$). After the second loop counter $S_M$ is greater or equal to total road segments M on the route $R_N$, then cumulative sums of "FOVOverlap$_{WP}$" and "Required FOV$_{WP}$" are calculated.

Continuing the algorithm 1500 at FIG. 16, at 1602, the service computing device 108 may determine the percentage of FOV coverage for the selected route $R_N$, i.e., $R_N$(FOVR$_N$) is equal to the cumulative total FOV coverage for the selected route $R_N$ divided by the cumulative total Required FOV for $R_N$. For example, the algorithm may determine the ratio of the two cumulative sums to calculate percentage of FOV covered by vehicle sensors for the route $R_N$ and stored in the vector variable "FOVR$_N$", this variable may be incremented as the first loop executes for all routes.

At 1604, the service computing device 108 may determine a cyclic difference of FOV coverage for all routes Delta FOV$_N$ (%)=FOVR$_N$–FOVR$_{N-1}$.

1604 Following this determination, the algorithm may go to block 1508 in FIG. 15 to determine whether all routes have been processed and also to block 1616.

At 1606, continuing from block 1512 of FIG. 15, the service computing device 108 may determine a travel time for the segment. For example, the algorithm may determine a travel time for each road segment from the map data database 156, and may store this information in vector variable TT$_{SM}$, after the second loop populates travel time for all road segments of a route $R_N$, then a cumulative sum of "$TT_{SM}$" is taken to find the total travel time "TT" for the route $R_N$.

At 1608, the service computing device 108 may determine the total travel time for the route $R_N$ (e.g., TT=Sum (Travel Time for $S_M$ ($TT_{SM}$))).

At 1610, the service computing device 108 may determine the cyclic difference of total time for all routes (e.g. DeltaTime$_N$(min.)=$TT_N$–$TT_{N-1}$). For example, to compare the candidate routes with each other and eliminate routes that have extremely long travel time, and to avoid routes with extremely low percentage of FOV coverage, a cyclic difference of "$FOVR_N$" and "TT" may be calculated for each route pair stored in the variables "DeltaFOV$_N$" and "Delta-Time$_N$".

At 1612, the service computing device 108 may determine whether DeltaTime$_N$ is greater than or equal to a first threshold. If so, the process goes to 1616. If not, the process goes to 1614 and ends. For example, the algorithm may eliminate candidate routes that have travel time difference above a user defined first threshold by comparing "Delta-Time$_N$" with a first time threshold.

At 1614, the service computing device 108 may remove the route from consideration because the time is not less than the first threshold and when the percentage of FOV coverage is less than a second threshold.

At 1616, the service computing device 108 may determine whether DeltaFOV$_N$ is less than or equal to a second threshold. If not, the process goes to block 1614 and ends for the selected route. If so, the process goes to block 1618.

At 1618, the service computing device 108 may select a set of routes that meet the first and second threshold. The process may return to block 1324 of FIG. 13. For example, from the remaining candidate routes, i.e., routes that meet the user defined percentage of FOV coverage threshold "Threshold 2" are selected and sent to the optimization algorithm.

FIG. 17 is a flow diagram illustrating an example drive horizon algorithm 1700 as a process for determining route efficiency according to some implementations. For instance, the drive horizon algorithm may use inputs such as real-time weather, road profile, and predicted speed profile to estimate the energy efficiency of the vehicle powertrain for the candidate routes. In some examples, the process 1700 may be executed by the system 100 discussed above. For example, the process 1700 may be executed by the service computing device 108 executing the speed profile algorithm. In some cases, the process 1700 may correspond to block 1320 of the process 1300 of FIG. 13 discussed above.

At 1702, the service computing device 108 may receive candidate routes as inputs. For example, as discussed above, the speed profile algorithm may receive a plurality of candidate routes from the routing and monitoring algorithm executed in either the descriptive analytics layer or the predictive analytics layer, e.g., as discussed above with respect to block 1314 of FIG. 13.

At 1704, the service computing device 108 may initialize a first loop by setting a first variable N=number of routes, e.g., representative of the total number candidate routes, and setting a second variable $R_N$=1, e.g., as a counter representative of the candidate route currently selected for processing.

At 1706, the service computing device 108 may determine whether the value of $R_N$ is greater than or equal to the value of N. If not, the process goes to block 1708. If so, the process goes to block 1728 because all candidate routes will have been processed.

At 1708, the service computing device 108 may initialize a nested second loop by setting a third variable M=number of segments of $R_N$, and setting a fourth variable $S_M$=1, e.g., as a counter representative of the segment currently selected for processing.

At 1710, the service computing device 108 may determine whether $S_M$ is greater than or equal to M. If not, the process goes to block 1714 and 1718. If so, the process goes to block 1712 to increment $R_N$.

At 1712, the service computing device 108 may increment the route counter $R_N$ by a value of one and go to 1706 to determine whether all routes have been processed.

At 1714, the service computing device 108 may receive speed profile information. For example, the drive horizon algorithm may receive, for the selected segment, the output of the speed profile algorithm discussed above with respect to FIG. 14.

At 1716, the service computing device 108 may determine a predicted speed for the selected segment $S_M$ based on the speed profile for the selected segment of the selected candidate route.

At 1718, the service computing device 108 may receive powertrain information, real-time weather and road profile information.

At 1720, the service computing device 108 may estimate powertrain load. For example, the algorithm may estimate the powertrain load based on the road profile and the real-time weather. Accordingly, for every road segment, the powertrain load may be estimated from the connected third party data such as weather, and road profile, which may be retrieve from the map data database 156.

At 1722, the service computing device 108 may use a powertrain model to determine predicted fuel or power usage for the segment $S_M$. For example, the estimated load and predicted speed profile may be used as inputs to a powertrain model (e.g., a data driven/physics based model) to predict vehicle efficiency for the selected road segment. Thus, the powertrain model receives the input estimated speed profile for the road segment $S_M$ as output from the speed profile algorithm discussed above with respect to FIG. 14. This procedure for vehicle efficiency calculation may be repeated for all road segments of each candidate route.

At 1724, the service computing device 108 may store the predicted energy efficiency for all segments of the respective candidate route $R_N$. The total efficiency for each candidate route may be subsequently calculated and given as input to the optimization algorithm.

At 1726, the service computing device 108 may increment the segment counter $S_M$ by a value of one and return to block 1710 to determine whether all segments have been processed.

At 1728, when all of the candidate routes have been processed, the service computing device 108 may determine the average efficiency for each candidate route $R_N$. This information may be subsequently provided to the optimization algorithm as discussed additionally below. The process may return to block 1324 of FIG. 13.

FIG. 18 is a flow diagram illustrating an example of the vehicle dynamics algorithm 1800 as a process for determining vehicle dynamics according to some implementations. For example, the vehicle dynamics algorithm may simulate vehicle dynamics performance for full/semi-autonomous vehicles, e.g., vehicle jerk, roll, pitch, yaw, crash safety, autonomous driving duration, etc., using inputs of speed limit and road geometry for each candidate route. The vehicle dynamics algorithm may select routes which avoid high crash probability, excessive vehicle jerk, roll, pitch, yaw and the like. In some examples, the process 1800 may be executed by the system 100 discussed above. For example, the process 1800 may be executed by the service computing device 108 executing the speed profile algorithm. In some cases, the process 1800 may correspond to block 1322 of the process 1300 of FIG. 13 discussed above.

At 1802, the service computing device 108 may receive candidate routes as inputs. For example, as discussed above, the speed profile algorithm may receive a plurality of candidate routes from the routing and monitoring algorithm executed in either the descriptive analytics layer or the predictive analytics layer, e.g., as discussed above with respect to block 1314 of FIG. 13.

At 1804, the service computing device 108 may initialize a first loop by setting a first variable N=number of routes, e.g., representative of the total number candidate routes, and setting a second variable $R_N$=1, e.g., as a counter representative of the candidate route currently selected for processing.

At 1806, the service computing device 108 may determine whether the value of $R_N$ is greater than or equal to the value of N. If not, the process goes to block 1808. If so, the process goes to block 1828 because all candidate routes will have been processed.

At 1808, the service computing device 108 may initialize a nested second loop by setting a third variable M=number of segments of $R_N$, and setting a fourth variable $S_M$=1, e.g., as a counter representative of the segment currently selected for processing.

At 1810, the service computing device 108 may determine whether $S_M$ is greater than or equal to M. If not, the process goes to block 1814 and 1818. If so, the process goes to block 1812 to increment $R_N$.

At 1812, the service computing device 108 may increment the route counter $R_N$ by a value of one and go to 1806 to determine whether all routes have been processed.

At 1814, the service computing device 108 may receive speed profile information. For example, the algorithm may receive, for the selected segment, the output of the speed profile algorithm discussed above with respect to FIG. 14.

At 1816, the service computing device 108 may predict speed for segment $S_M$.

At 1818, the service computing device 108 may receive real-time weather and road geometry information.

At 1820, the service computing device 108 may estimate the road condition. For example, for road segment $S_M$, the road conditions are estimated with inputs from road geometry (HD map) from the map data database 156 and real-time weather from a third party.

At 1822, the service computing device 108 may use a vehicle dynamics model to determine vehicle behavior based on chassis spec, road condition, and predicted speed. For example, the estimated road conditions are passed to the vehicle dynamics model (built using a combination of physics-based and AI models). The vehicle dynamics model also receives, as an input, the estimated speed profile for road segment $S_M$ received from the speed profile algorithm.

At 1824, the service computing device 108 may perform traffic simulation for the segment $S_M$. For example, the output of the vehicle dynamics model may be co-simulated with a traffic model. The output of this co-simulation provides vehicle behavior parameters such as roll, pitch, yaw, jerk, turning rate at road curvatures/exits, vehicle footprint and road dimension violations, etc., of the vehicle for road-segment $S_M$.

At 1826, the service computing device 108 may store predicted energy efficiency for all segments of the respective candidate route $R_N$. For example, the second loop may store the efficiency values for all road segments.

At 1828, the service computing device 108 may increment the segment counter $S_M$ by a value of one and return to block 1710 to determine whether all segments have been processed.

At 1830, the service computing device 108 may determine average vehicle behavior parameters for each candidate route $R_N$. For example, for each candidate route, the vehicle dynamics algorithm may output an averaged value of vehicle behavior parameters for each candidate route, along with individual road segment vehicle behavior parameters. This information may be subsequently provided to the optimization algorithm as discussed additionally below. The process may return to block 1324 of FIG. 13.

FIG. 19 is a flow diagram illustrating an example optimization algorithm 1900 as a process for route optimization according to some implementations. For example, the outputs from the above discussed algorithms are fed to the optimization algorithm 1900. The routing optimization herein may be considered as a combinatorial problem. Accordingly, an exact optimal solution might typically be achieved for problems with only a small set of parameters. To address this issue, implementations herein employ AI-based optimization to achieve a global/local optimum for routing with a large optimization parameter space and also employ rule-based heuristics to ensure feasible results. In some examples, the process 1900 may be executed by the system 100 discussed above. For example, the process 1900 may be executed by the service computing device(s) 108 by executing the navigation information program 146 or other algorithms in some examples. In addition, in some cases, the process 1900 may correspond in part to block 1324 of the process 1300 of FIG. 13 discussed above.

At 1902, the service computing device 108 may receive, as inputs, candidate routes from route FOV algorithm, drive horizon algorithm, and vehicle dynamics algorithm. For example, the optimization algorithm may receive the outputs of the route FOV algorithm, the drive horizon algorithm, and the vehicle dynamics algorithm, as discussed above with respect to FIGS. 15-18.

At 1904, the service computing device 108 may initiate route search request. For example, After receiving the detailed route information, the optimization algorithm may initiate a route search request function that initializes the optimization.

At 1906, the service computing device 108 may collect road segment network topology and information about each road segment on all routes, i.e., percent FOV coverage, efficiency, comfort, collision probability, travel time, traffic, planning horizon, and so forth. For example, information may be collected regarding road network topology and information about each road segment on all of the selected routes passed to the optimization module. An optimization iteration loop may be initiated to check whether customizable (user defined) convergence criteria is met. If not, then optimization may be conducted for all selected routes.

At 1908, the service computing device 108 may determine whether the algorithm has converged. If so, the process goes to 1924. If not, the process goes to 1912.

At 1910, the service computing device 108 may receive customizable convergence criterion such as a safety threshold, efficiency threshold, and/or comfort threshold.

At 1912, the service computing device 108 may determine whether all routes have been evaluated. If so, the process goes to 1914. If not, process goes to 1916.

At 1914, the service computing device 108 may terminate the process.

At 1916, the service computing device 108 may execute an AI-based optimization routing simulator.

At 1918, the service computing device 108 may receive an objective function, e.g., J=w1*TT+w2*% FOVcoverage+w3*efficiency+w4*comfort+w5*ADDuration . . . , where w1–w5 are weighting values. The objective function may be customizable.

At 1920, the service computing device 108 may also receive defined constraints such as traffic jam, expected time of arrival, vehicle sensor FOV, vehicle dynamics, powertrain dynamics, and so forth.

At 1922, the service computing device 108 may apply rule-based heuristics to the AI-based optimization routing simulator. For example, the AI-based optimization simulator may receive a customizable, e.g., user defined, objective function and user defined constraints that may be provided as input, along with collected road segment and road network information. The AI based optimization routing simulator may be executed to evaluate the defined objective function and constraints on the input data. The output of AI based optimization routing simulator may be passed to the rule-based heuristics. The output of the heuristics functions may be provided as feedback to AI based optimization routing simulator to enable feasible and fast convergence.

At 1924, the service computing device 108 may select the best (optimal) route. For example, after the optimization AI based optimization routing simulator converges, the best route may be selected and sent to the vehicle.

At 1926, the service computing device 108 may update the selected route based on received updated local condition information, such a traffic information, weather information, or the like. The update may be performed periodically, or in response to an event such as receipt of new local condition information. For example, the update may be triggered based on an event such as based on live traffic information, e.g., a traffic jam event triggers the update to find an alternative route.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors; and
one or more non-transitory computer-readable media including executable instructions, which, when executed by the one or more processors, configure the one or more processors to perform operations comprising:
determining a plurality of routes between a source location and a destination location;
segmenting each route of the plurality of routes into multiple road segments;
receiving, from a database, a respective first field of view (FOV) for each respective road segment of the multiple road segments of the plurality of routes, each respective first FOV corresponding to a zone of the respective road segment that has been specified for monitoring by vehicles during traversal of the road segment and based on at least one of a safety requirement or an automated driving requirement;
receiving vehicle sensor configuration information for vehicle sensors on board a vehicle;
determining a second FOV indicating a zone of sensor coverage around the vehicle provided by the vehicle sensors;
comparing the second FOV with the respective first FOVs received from the database for the respective road segments of the multiple road segments to determine a first subset of the routes, wherein the first subset of the routes indicates a higher FOV coverage of the first FOV by the vehicle sensors, indicative of at least one of route safety or a capability of being traversed by automated driving;
determining a predicted fuel consumption for the vehicle for the plurality of the routes;
determining predicted vehicle dynamics for the vehicle for the plurality of the routes, wherein determining the predicted vehicle dynamics includes determining, based at least in part on a road geometry for individual routes of the plurality of routes, at least one of a predicted vehicle jerk, roll, pitch, or yaw; and
selecting a route for the vehicle from the first subset based at least on the higher FOV coverage, the predicted fuel consumption and the predicted vehicle dynamics.

2. The system as recited in claim 1, wherein a respective first FOV for a respective road segment includes one or more zones of the respective road segment selected for monitoring with the vehicle sensors to at least one of avoid collisions or perform automated driving.

3. The system as recited in claim 1, the operation of comparing the second FOV with the respective first FOVs for the multiple road segments to determine a first subset of the routes further comprises:

determining an amount of overlap of the second FOV with the respective first FOV for each road segment; and determining a cumulative amount of overlap for a respective route based on aggregating the amounts of overlap for the road segments included in the respective route.

4. The system as recited in claim 1, the operations further comprising:

receiving the vehicle sensor configuration information for the vehicle sensors on board the vehicle in a communication received from the vehicle; and determining the second FOV for the vehicle sensors based at least on the received vehicle sensor configuration information indicating a type of the vehicle sensors.

5. The system as recited in claim 1, the operations further comprising:

determining a speed profile for individual segments of the multiple segments, the speed profile indicating a predicted speed of the vehicle for traversing the individual segments; and determining the predicted vehicle dynamics and predicted fuel consumption based partially on the predicted speed.

6. The system as recited in claim 1, the operation of selecting the route for the vehicle from the first subset based at least on the FOV coverage, the predicted fuel consumption and the predicted vehicle dynamics further comprising:

selecting the route by considering user defined criteria including at least one of an FOV overlap threshold, an efficiency threshold, or a comfort threshold.

7. A method comprising:

determining, by one or more processors, a plurality of routes between a source location and a destination location;

segmenting each route of the plurality of routes into multiple road segments;

receiving, from a database, a respective first field of view (FOV) for each respective road segment of the multiple road segments of the plurality of routes, each respective first FOV corresponding to a zone of the respective road segment that has been specified for monitoring by vehicles during traversal of the road segment and based on at least one of a safety requirement or an automated driving requirement;

receiving vehicle sensor configuration information for vehicle sensors on board a vehicle;

determining a second FOV indicating a zone of sensor coverage around the vehicle provided by the vehicle sensors; and selecting a route for the vehicle, from the plurality of routes, and based at least on comparing the second FOV with the respective first FOVs received from the database for the respective road segments of the multiple road segments of the plurality of routes.

8. The method as recited in claim 7, wherein a respective first FOV for a respective road segment includes one or more zones of the respective road segment selected for monitoring with the vehicle sensors to at least one of avoid collisions or perform automated driving.

9. The method as recited in claim 7, wherein comparing the second FOV with the respective first FOVs for the multiple road segments further comprises:

determining an amount of overlap of the second FOV with the respective first FOV for each road segment; and determining a cumulative amount of overlap for a respective route based on aggregating the amounts of overlap for each of the road segments included in the respective route.

10. The method as recited in claim 7, further comprising:

receiving vehicle information indicating at least a powertrain configuration of the vehicle;

determining a predicted fuel consumption for the vehicle for the plurality of the routes based at least in part on the received powertrain configuration; and selecting the route based partially on considering the predicted fuel consumption.

11. The method as recited in claim 7, further comprising:

receiving vehicle information indicating the configuration of the vehicle, wherein the information indicating the configuration of the vehicle includes at least one of powertrain information or chassis information for the vehicle;

determining predicted vehicle dynamics for the vehicle for the plurality of the routes based at least partially on the received information indicating the configuration of the vehicle, wherein determining the predicted vehicle dynamics includes determining, based at least in part on a road geometry for individual routes of the plurality of routes, at least one of a predicted vehicle jerk, roll, pitch, or yaw; and selecting the route based partially on considering the predicted vehicle dynamics.

12. The method as recited in claim 7, further comprising determining that the selected route conforms to a time threshold and an FOV coverage threshold prior to selecting the route for the vehicle.

13. The method as recited in claim 7, further comprising:

receiving the one or more current conditions over a network from one or more computing devices, the one or more current conditions including at least one of: weather conditions, or traffic conditions; and selecting a different route for the vehicle based on receiving the one or more current conditions.

14. A system comprising:

one or more processor configured by executable instructions to perform operations comprising:

determining a plurality of routes between a source location and a destination location;

segmenting each route of the plurality of routes into multiple road segments;

receiving, from a database, a respective first field of view (FOV) for each respective road segment of the multiple road segments of the plurality of routes, each respective first FOV corresponding to a zone of the respective road segment that has been specified for monitoring by vehicles during traversal of the road segment and based on at least one of a safety requirement or an automated driving requirement;

receiving vehicle sensor configuration information for vehicle sensors on board a vehicle;

determining a second FOV indicating a zone of sensor coverage around the vehicle provided by the vehicle sensors; and selecting a route for the vehicle, from the plurality of routes, and based at least on comparing the second FOV with the respective first FOVs received from the database for the respective road segments of the multiple road segments of the plurality of routes.

15. The system as recited in claim 14, wherein a respective first FOV for a respective road segment includes one or more zones of the respective road segment selected for monitoring with the vehicle sensors to at least one of avoid collisions or perform automated driving.

16. The system as recited in claim 14, wherein the operation of comparing the second FOV with the respective first FOVs for the multiple road segments further comprises:
  determining an amount of overlap of the second FOV with the respective first FOV for each road segment; and
  determining a cumulative amount of overlap for a respective route based on aggregating the amounts of overlap for each of the road segments included in the respective route.

17. The system as recited in claim 14, the operations further comprising:
  receiving vehicle information indicating at least a powertrain configuration of the vehicle;
  determining a predicted fuel consumption for the vehicle for the plurality of the routes based at least in part on the received powertrain configuration; and
  selecting the route based partially on considering the predicted fuel consumption.

18. The system as recited in claim 14, the operations further comprising:
  receiving vehicle information indicating a configuration of the vehicle, wherein the information indicating the configuration of the vehicle includes at least one of powertrain information or chassis information for the vehicle;
  determining predicted vehicle dynamics for the vehicle for the plurality of the routes based at least partially on the received information indicating the configuration of the vehicle, wherein determining the predicted vehicle dynamics includes determining, based at least in part on a road geometry for individual routes of the plurality of routes, at least one of a predicted vehicle jerk, roll, pitch, or yaw; and
  selecting the route based partially on considering the predicted vehicle dynamics.

19. The system as recited in claim 14, the operations further comprising determining that the selected route conforms to a time threshold and an FOV coverage threshold prior to selecting the route for the vehicle.

20. The system as recited in claim 14, the operations further comprising:
  receiving the one or more current conditions over a network from one or more computing devices, the one or more current conditions including at least one of: weather conditions, or traffic conditions; and
  selecting a different route for the vehicle based on receiving the one or more current conditions.

* * * * *